United States Patent [19]

Dennis

[11] 4,049,278
[45] Sept. 20, 1977

[54] AUTOMATIC RECORD CHANGER

[76] Inventor: James T. Dennis, 3900 SE. 29th St., Oklahoma City, Okla. 73115

[21] Appl. No.: 432,089

[22] Filed: Jan. 9, 1974

[51] Int. Cl.² ............................................. G11B 17/16
[52] U.S. Cl. ........................................... 274/10 R
[58] Field of Search ................................. 274/10 R

[56] References Cited

U.S. PATENT DOCUMENTS

| | | | |
|---|---|---|---|
| 2,293,212 | 8/1942 | Offen | 274/10 R |
| 2,549,246 | 4/1951 | Schweitzer | 274/10 R |
| 2,578,378 | 12/1951 | Stolberg | 274/10 R |
| 2,640,703 | 6/1953 | Smith | 274/10 R |
| 2,651,523 | 9/1953 | Dale | 274/10 S |
| 2,657,060 | 10/1953 | Lapisl | 274/10 R |
| 2,661,216 | 12/1953 | Mills et al. | 274/10 R |
| 2,803,465 | 8/1957 | Dobrogowski et al. | 274/10 R |
| 3,220,735 | 11/1965 | Beugin | 274/9 A |
| 3,408,081 | 10/1968 | Dennis | 274/10 R |

Primary Examiner—Steven L. Stephan
Attorney, Agent, or Firm—Mason, Kolehmainen, Rathburn & Wyss

[57] ABSTRACT

An automatic record changer is provided in which either 7-inch records or 12-inch records are supported at the edge thereof by an adjustable platform and at the center by a flat blade spindle having no moving parts, the platform being moved bodily toward the spindle in either the 7-inch or 12-inch position thereof to eject the bottom record from the flat blade spindle. The speed of the turntable is adjusted to 45 rpm in response to the positioning of a large hole record spindle at the center of the turntable in place of the flat blade spindle. Provision for automatic shut off is made either substantially instantaneously in response to movement of the tone arm beyond the rest post position during a playing cycle or at the end of an automatic record changing cycle if the control knob is turned to OFF during a record changing cycle.

A spindle stub is provided at the center of the turntable which may be adjusted vertically to provide a manual speed control for the turntable, this stub also acting as a centering spindle stub for automatic playing of a single record which is deposited manually on the turntable with automatic shut off after the single record has been played once. In the alternative, the single record may be played repeatedly in response to the positioning of a hold down arm in a repeat play position.

14 Claims, 49 Drawing Figures

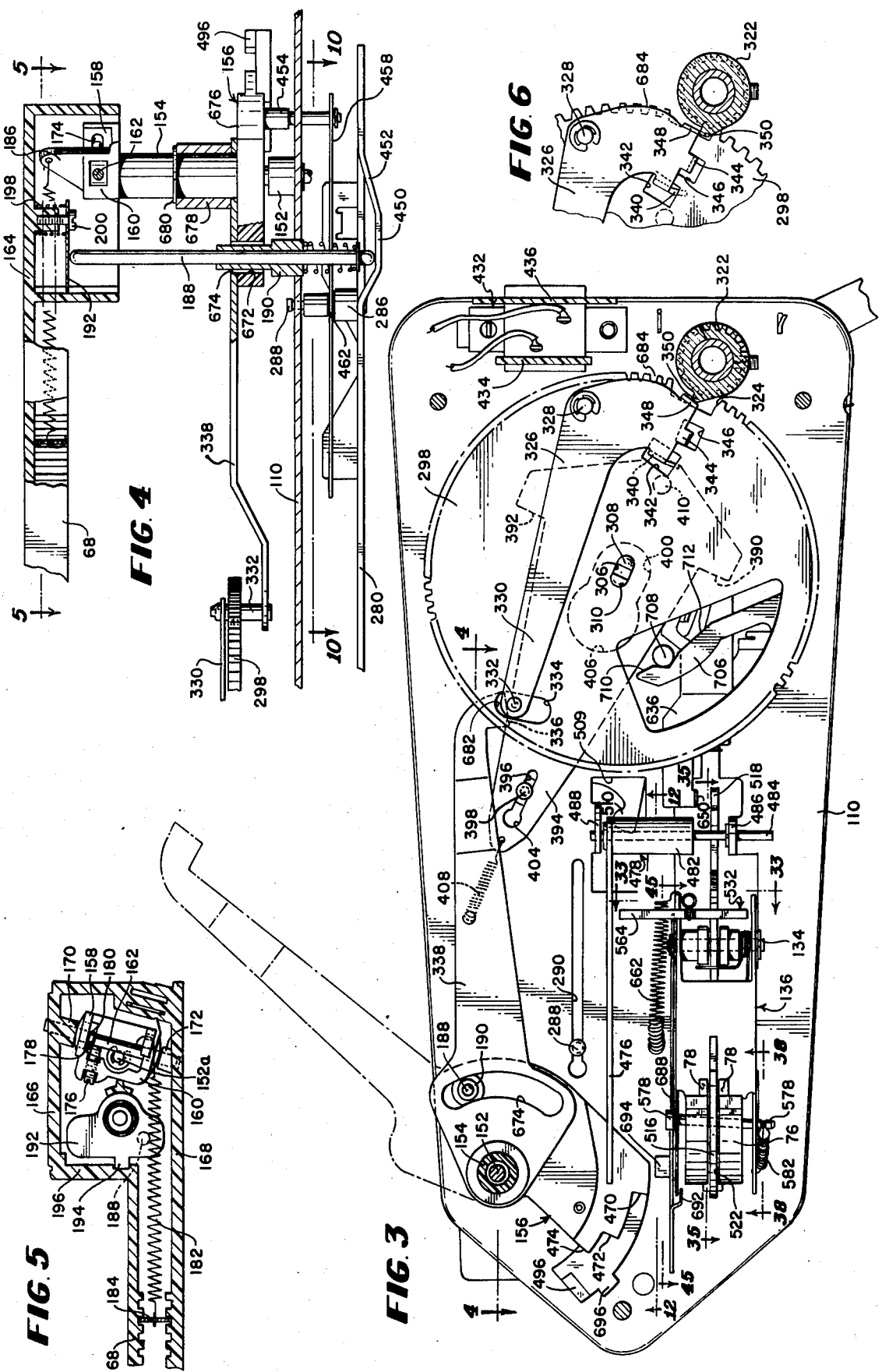

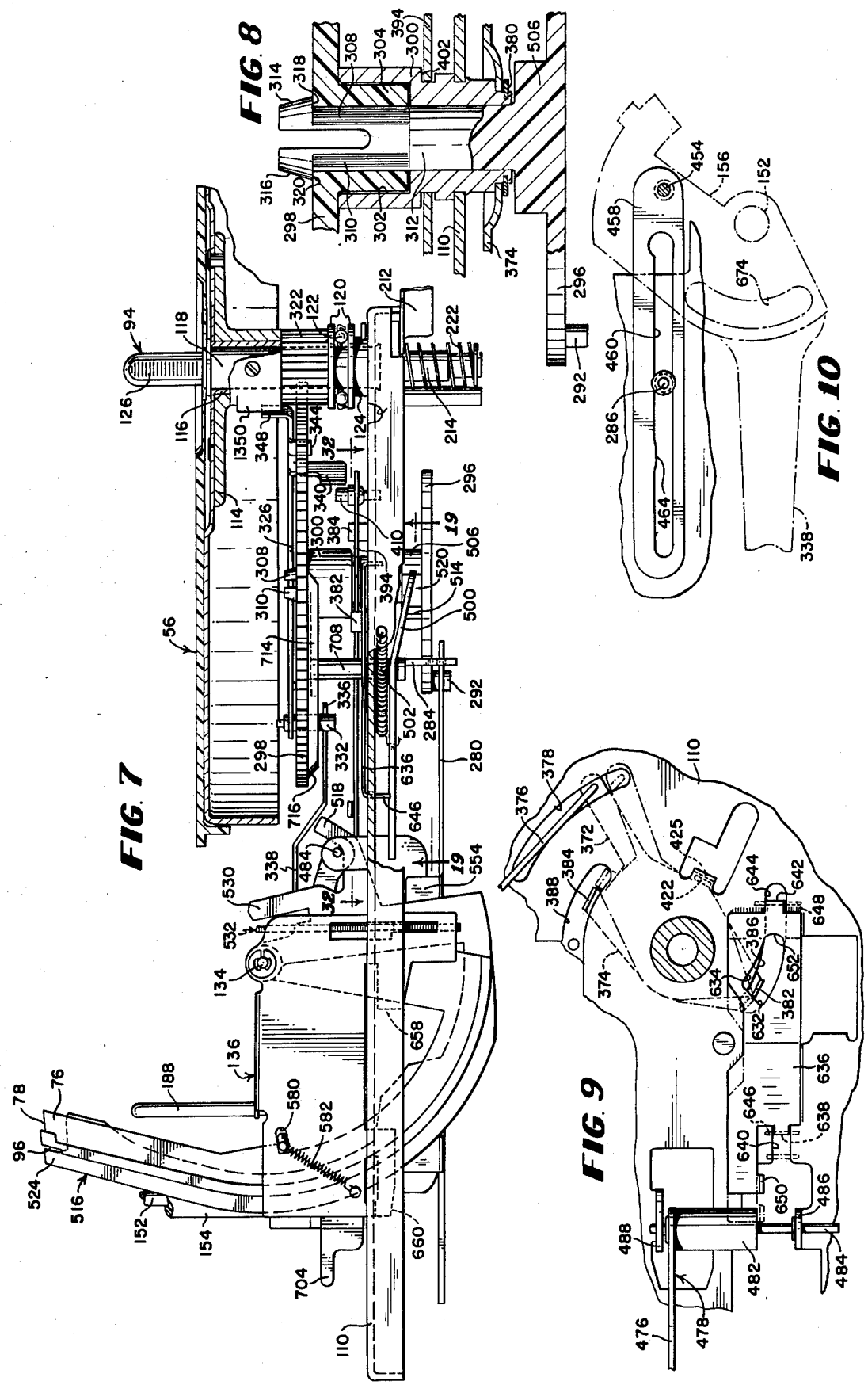

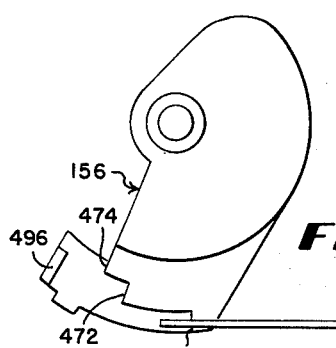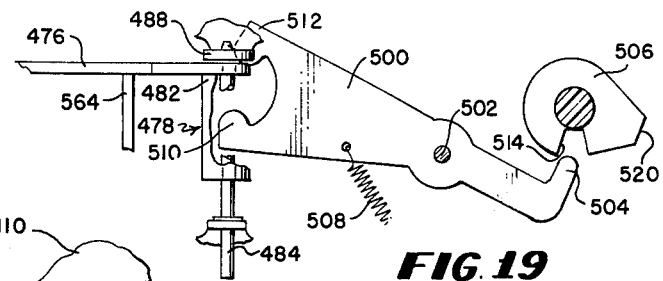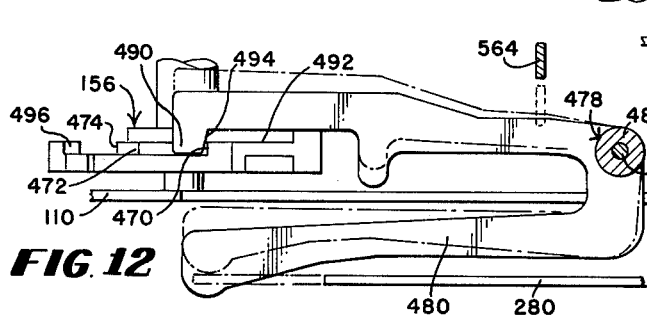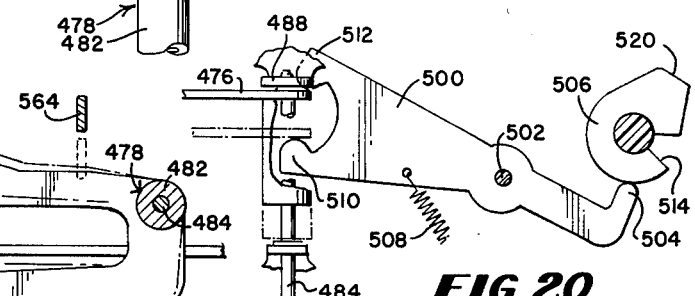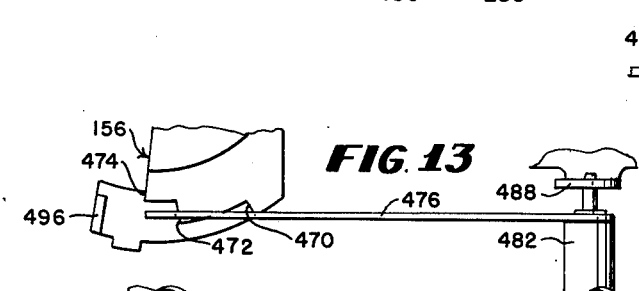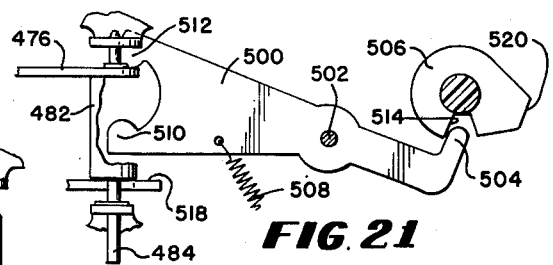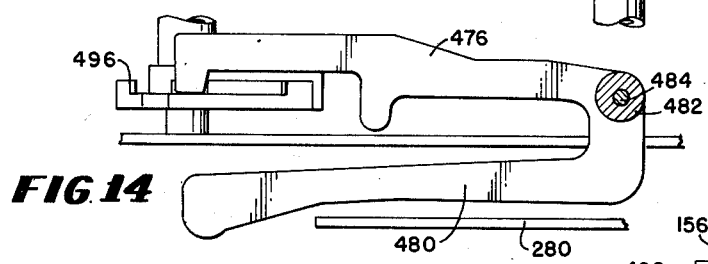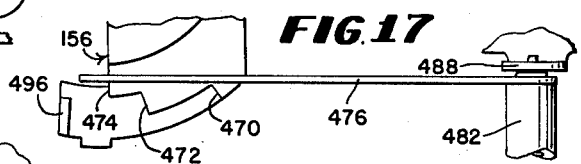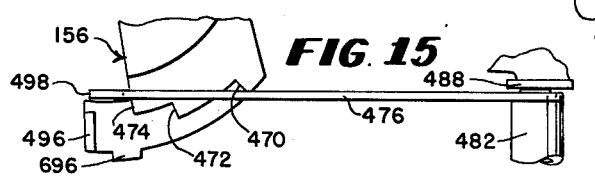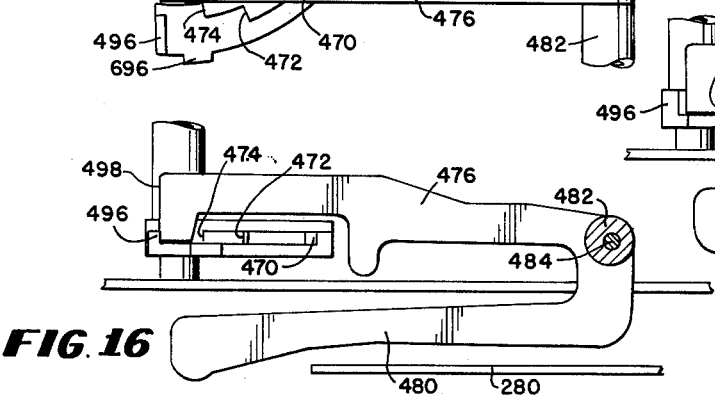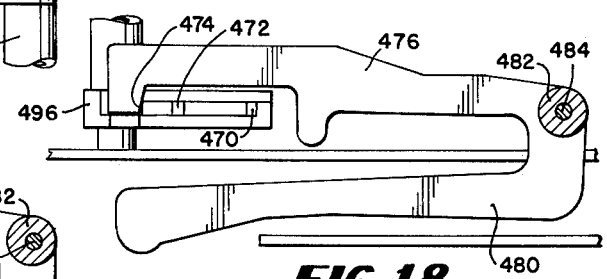

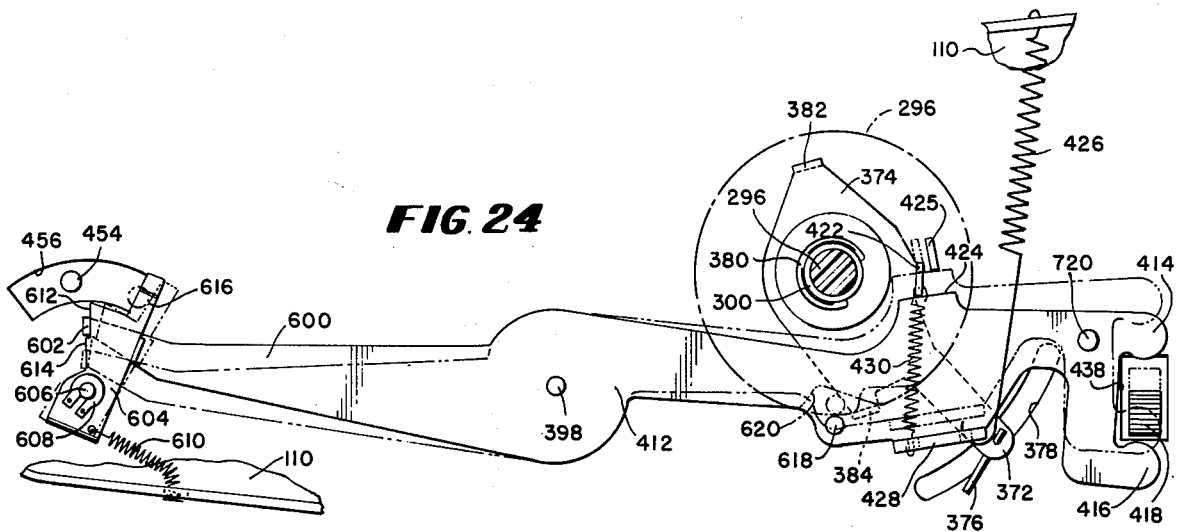
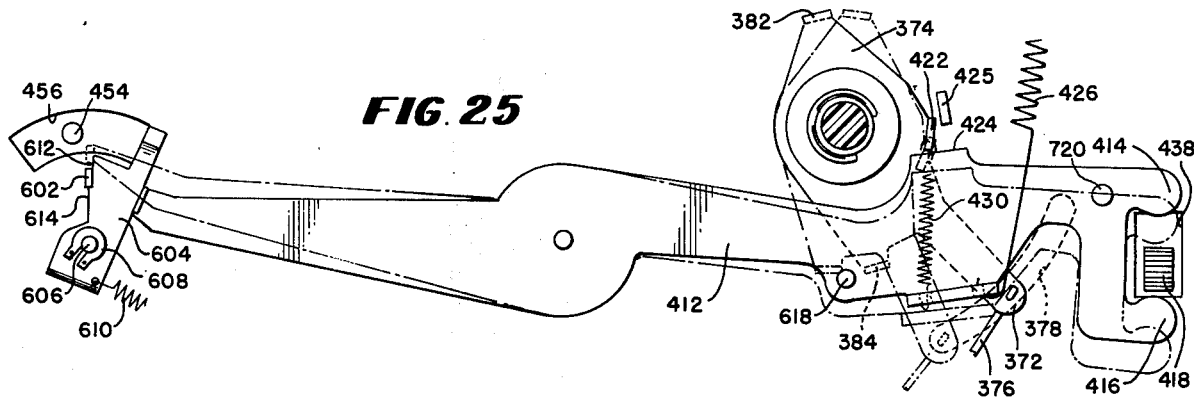
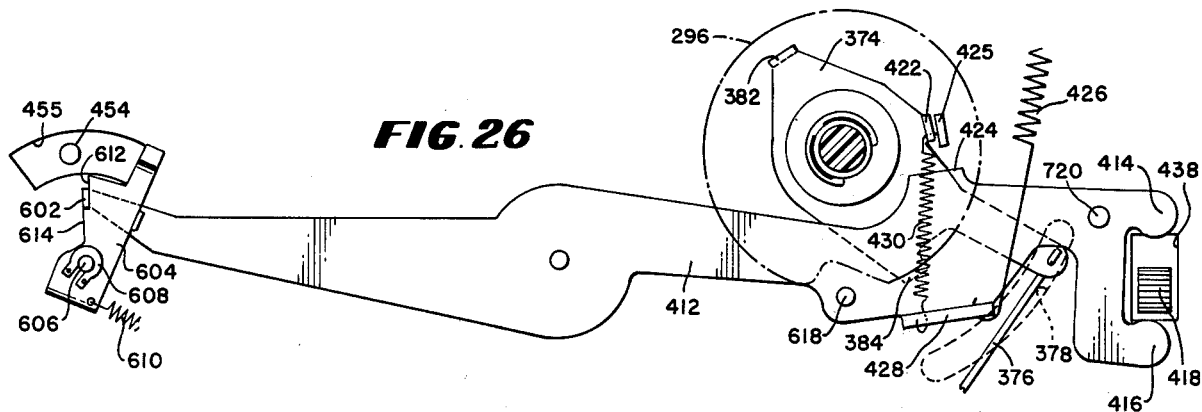
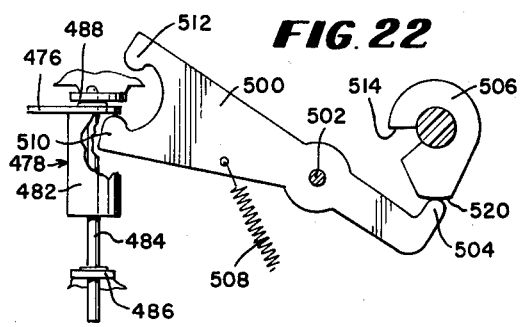
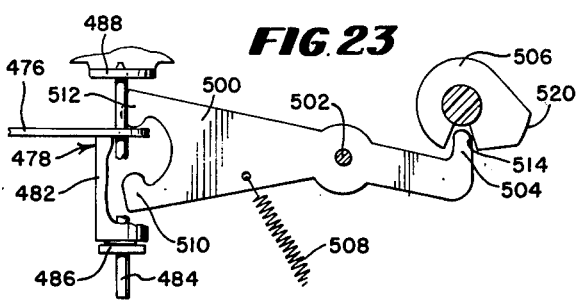

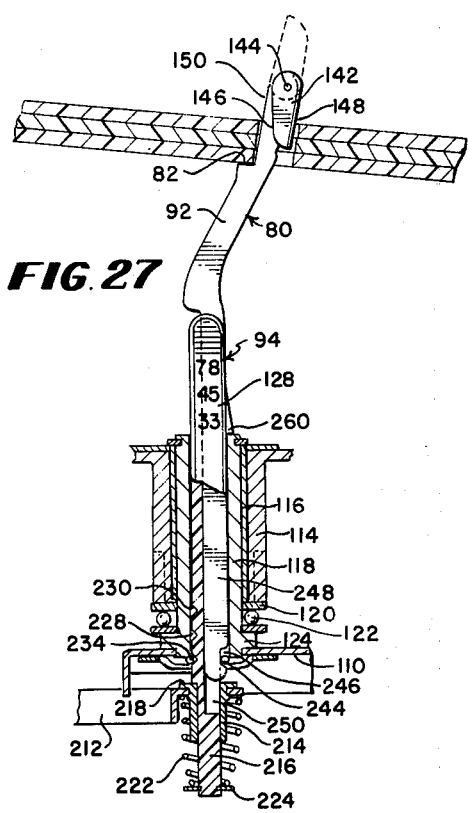
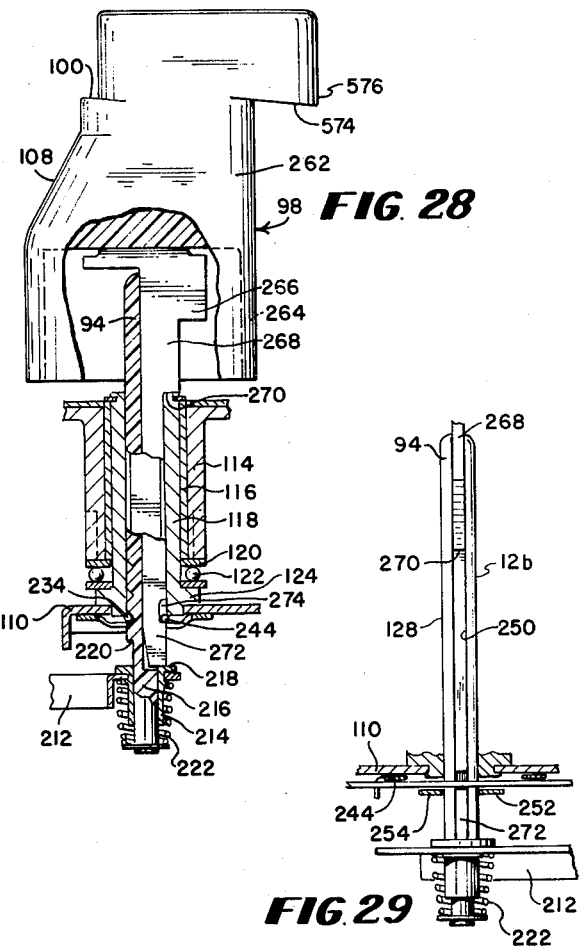
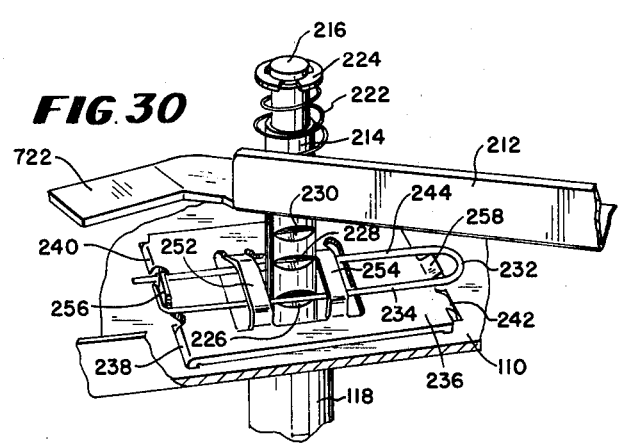
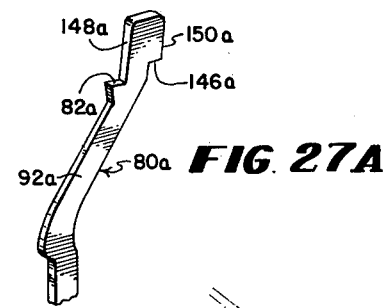
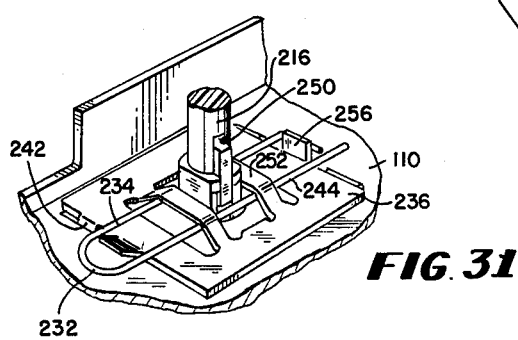
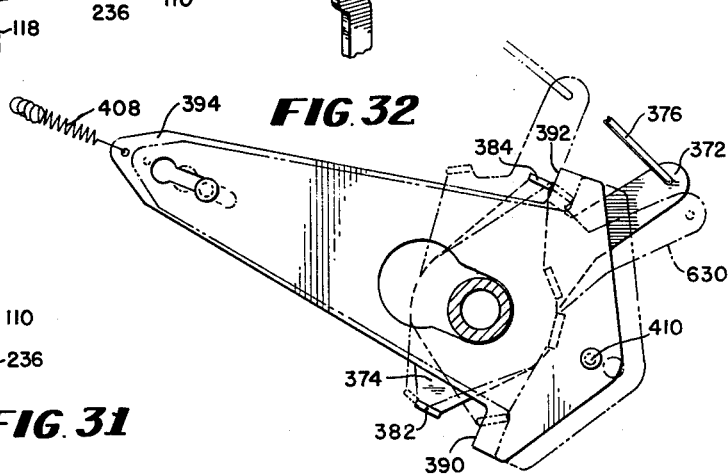

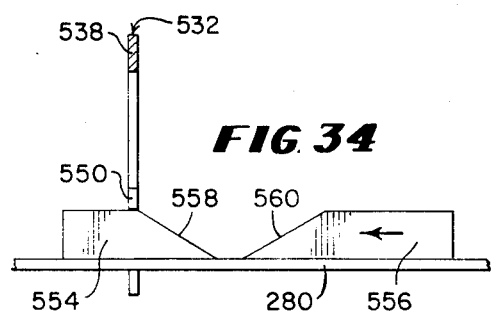
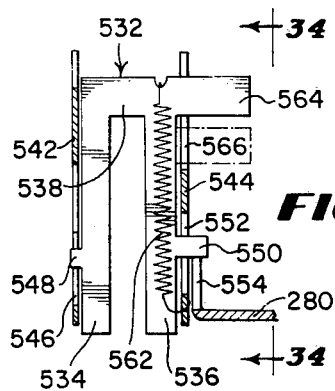
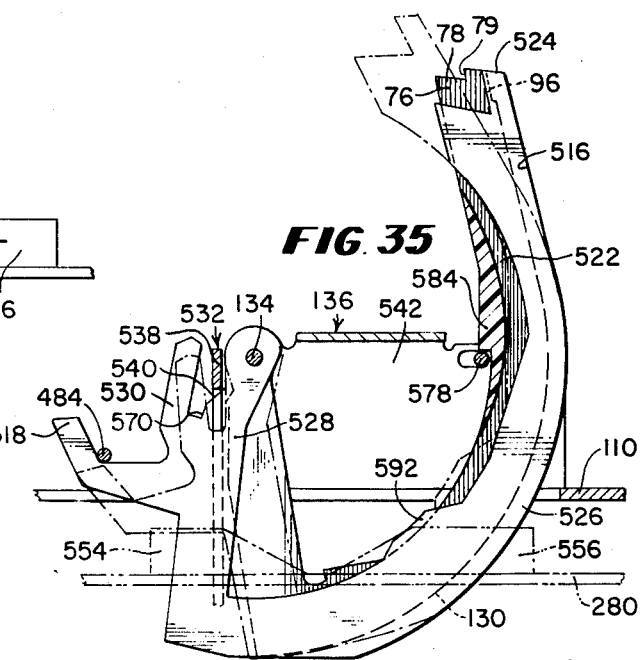
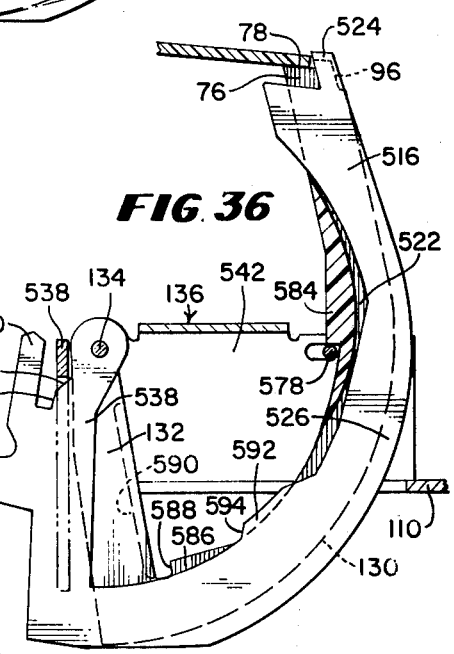
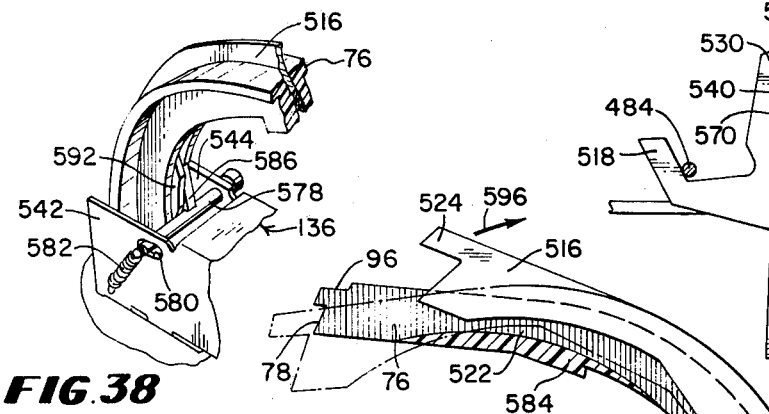
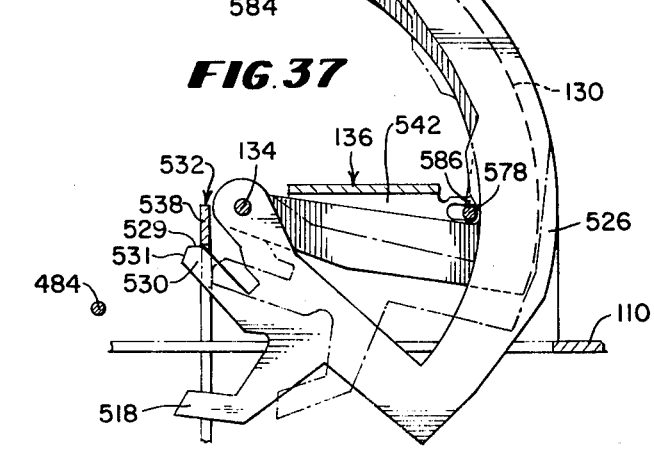

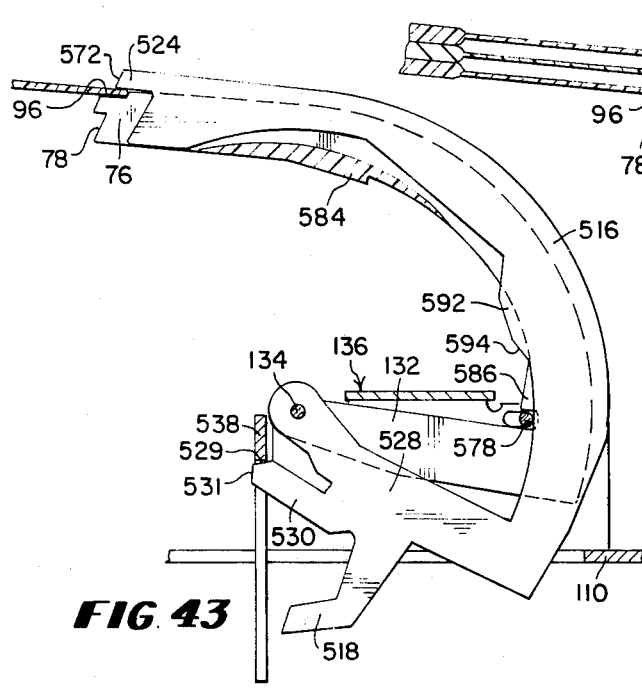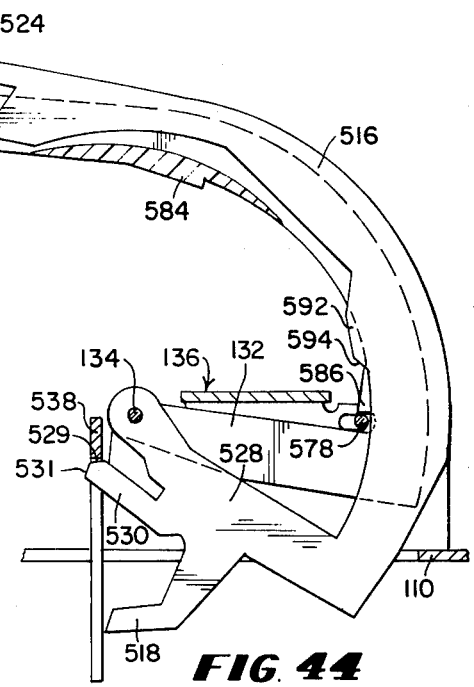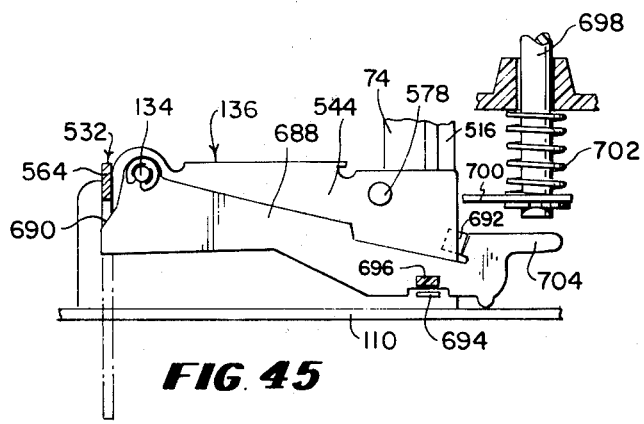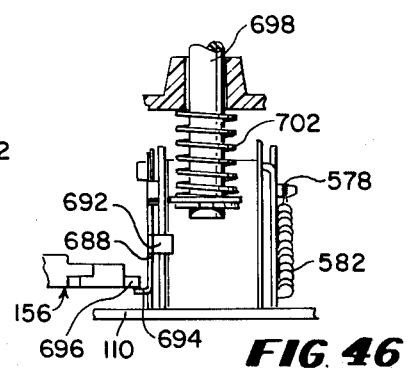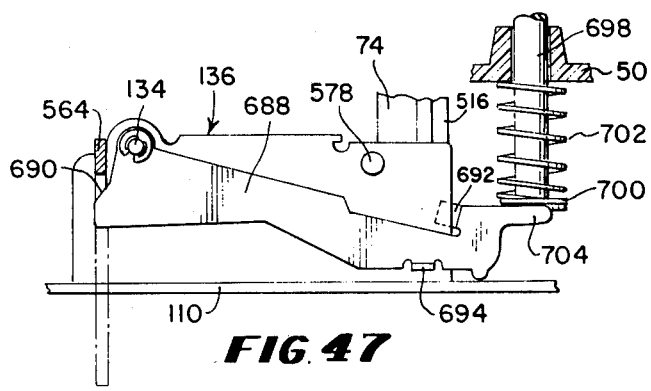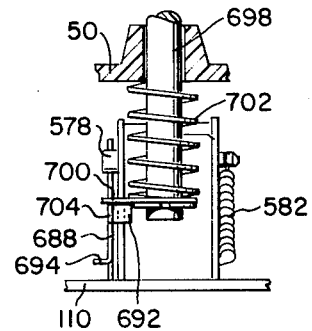

AUTOMATIC RECORD CHANGER

AUTOMATIC RECORD CHANGER

The present invention relates to automatic record changers, and more particularly to record changers of the type which support the record stack at the outer edge thereof by means of an adjustable platform positioned beyond the rotating turntable of the record changer.

Various arrangements have been heretofore proposed in which the outer edge of the record stack is supported by an adjustable platform which may be variably positioned to engage the outer edge of different sizes of records. Such arrangements are shown, for example, in Dennis U.S. Pat. No. 3,408,081 and Dobrogowski et al U.S. Pat. No. 2,803,465. While these platform support arrangements are in general suitable for their intended purpose, they are quite complex and expensive, particularly with regard to the type of centering spindle which is employed to support the record stack at the center thereof. Usually, this centering spindle is also provided with an ejector blade for movement of the bottom record off of the supporting shelf on the spindle. In the alternative, provision has been made for rocking the record edge supporting platform to cause ejection of the record, but here again, the arrangement has been quite complicated and expensive. In addition, no provision is made for the manual play of single records, either in a single play mode or repeat play mode with automatic shutoff after the playing cycle. Furthermore, the facilities provided for changing the speed of the turntable manually in such platform changers usually require a separate control knob which must be actuated in addition to the conventional on-off reject control of the changer which results in a somewhat more complex control arrangement which does not lend itself to streamlined styling and the like.

While various arrangements have been proposed in the past for automatically shutting off a record changer, these arrangements in general have been either of the instantaneous type wherein the changer may be stopped during a record changing cycle with the idler wheel in engagement with the turntable rim, or of the type wherein an automatic shut-off cycle is set up and only after this shutoff cycle is completed and the idler wheel removed from the turntable is the changer turned off. The instantaneous shutoff has the disadvantage that flat portions on the idler wheel may be formed during periods when the changer is not in use. On the other hand, the automatic shutoff cycle type of changer requires a certain minimum length of time to shut off the changer, which may be inconvenient to the user.

It is a primary object of the present invention to provide a new and improved automatic record changer wherein one or more of the above discussed disadvantages of the prior art arrangements are eliminated.

It is another object of the present invention to provide a new and improved automatic record changer wherein either 7-inch 45 rpm records or 12-inch 33⅓ rpm records are supported at the edge thereof by an adjustable platform and at the center by a flat blade spindle having no moving parts.

It is another object of the present invention to provide a new and improved automatic record changer wherein either 7-inch or 12-inch records are supported at the edge thereof by an adjustable platform and at the center by a flat blade spindle having no moving parts, the platform being movable bodily toward the spindle in either the 7-inch or 12-inch position thereof to eject the bottom record from the flat blade spindle.

It is a further object of the present invention to provide a new and improved automatic record changer arrangement in which the speed of the turntable is automatically adjusted to 45 rpm in response to the positioning of a large hole record spindle at the center of the turntable in place of the conventional small hole record centering spindle.

It is another object of the present invention to provide a new and improved automatic record changer wherein 7-inch or 12-inch records may be played automatically and a spindle stub is provided at the center of the turntable which may be adjusted vertically to provide a manual speed control for the turntable.

It is a still further object of the present invention to provide a new and improved automatic record changer wherein 7-inch or 12-inch records are supported at the edge thereof by an adjustable platform and at the center by a flat blade spindle, this spindle being removable from a slot within a center spindle stub so as to provide facilities for manual play of a spindle record on the spindle stub after the automatic record changer centering spindle is removed.

It is another object of the present invention to provide an automatic record changer arrangement wherein the centering spindle may be removed and facilities are provided for playing a single record which is deposited manually on the turntable with automatic shutoff after the single record has been played once.

It is a further object of the present invention to provide a new and improved automatic record changer wherein a single record may be positioned manually on the turntable and may be played repeatedly in response to the positioning of a hold-down arm in a repeat play position in which the hold-down arm is positioned beyond its loading position normally employed for loading records onto the changer.

It is a further object of the present invention to provide a new and improved automatic record changer wherein the changer is shut off substantially instantaneously in response to movement of the tone arm beyond the rest post position during a playing cycle and may also be shut off at the end of an automatic record changing cycle if the control knob is turned to off during a record changing cycle.

Briefly, in accordance with one aspect of the invention, an automatic record changer is provided in which either 7-inch records or 12-inch records are supported at the edge thereof by an adjustable platform and at the center by a flat blade spindle having no moving parts, the platform being moved bodily toward the spindle in either the 7-inch or 12-inch position thereof to eject the bottom record from the flat blade spindle. The speed of the turntable is adjusted to 45 rpm in response to the positioning of a large hole record spindle at the center of the turntable in place of the flat blade spindle. Provision for automatic shut off is made either substantially instantaneously in response to movement of the tone arm beyond the rest post position during a playing cycle or at the end of an automatic record changing cycle if the control knob is turned to OFF during a record changing cycle.

A spindle stub is provided at the center of the turntable which may be adjusted vertically to provide a manual speed control for the turntable, this stub also acting as a centering spindle stub for automatic playing of a single record which is deposited manually on the turntable with automatic shut off after the single record has been played once. In the alternative, the single record may be played repeatedly in response to the positioning of a hold down arm in a repeat play position.

The invention, both as to its organization and method of operation, together with further objects and advantages thereof, will best be understood by reference to the following specification taken in connection with the accompanying drawings in which:

FIG. 3 is a plan view of the record changer subassembly which is mounted on the underside of the base plate shown in FIG. 1;

FIG. 4 is a sectional view taken along the line 4—4 of FIG. 3;

FIG. 5 is a sectional view taken along the line 5—5 of FIG. 4;

FIG. 6 is a fragmentary plan view of the subassembly of FIG. 3;

FIG. 7 is a front elevational view partly in section, of the subassembly of FIG. 3;

FIG. 8 is a fragmentary side elevational view, on a somewhat larger scale, of a portion of the subassembly shown in FIG. 7;

FIG. 9 is a fragmentary plan view partly in section, of a portion of the subassembly of FIG. 3;

FIG. 10 is a sectional view taken along the line 10—10 of FIG. 4;

FIG. 11 is a fragmentary plan view of the tone arm indexing portion of the subassembly of FIG. 3;

FIG. 12 is a sectional view taken along the line 12—12 of FIG. 3;

FIGS. 13, 15 and 17 are views similar to FIG. 11 but showing the tone arm indexing pawl in different positions;

FIGS. 14, 16 and 18 are views similar to FIG. 12 but showing the tone arm indexing pawl in different positions corresponding to FIGS. 13, 15 and 17, respectively;

FIG. 19 is a sectional view taken along the line 19—19 of FIG. 7;

FIGS. 20, 21, 22 and 23 are views similar to FIG. 19 but showing the control cam and tone arm indexing pawl in different positions;

FIG. 24 is a bottom view of the subassembly shown in FIG. 2 but with the cycling side thereof removed;

FIGS. 25 and 26 are views similar to FIG. 24 but illustrating different positions of the control linkage and shutoff bar mechanism;

FIG. 27 is a sectional view taken along the line 27—27 of FIG. 1;

FIG. 27A is a fragmentary perspective view of an alternative flat blade spindle which may be used in the changer of FIG. 1;

FIG. 28 is a view similar to FIG. 27 but showing a 45 rpm adaptor positioned for playing large hole 45 rpm records;

FIG. 29 is a fragmentary side elevational view of FIG. 28;

FIG. 30 is a bottom perspective view on a somewhat enlarged scale of the spindle speed control detent mechanism of FIG. 27;

FIG. 31 is a perspective view similar to FIG. 30 but from the opposite side of the spindle speed control mechanism;

FIG. 32 is a sectional view taken along the line 32—32 of FIG. 7;

FIG. 33 is a sectional view taken along the line 33—33 of FIG. 3;

FIG. 34 is a sectional view taken along the line 34—34 of FIG. 33;

FIG. 35 is a sectional view taken along the line 35—35 of FIG. 3;

FIGS. 36 and 37 are views similar to FIG. 35 but showing the record supporting platform in different positions;

FIG. 38 is a perspective view taken along the line 38—38 of FIG. 3;

FIGS. 43 and 44 are views similar to FIG. 37 but with the record supporting platform in its 7-inch record supporting position and showing different positions of the last record sensing member;

FIG. 45 is a sectional view taken along the line 45—45 of FIG. 3;

FIG. 46 is a right side view of the portion of the changer shown in FIG. 45;

FIG. 47 is a view similar to FIG. 45 but showing the hold-down arm in a repeat play position; and FIG. 48 is a right side view of the portion of the changer shown in FIG. 47;

Figure 1:
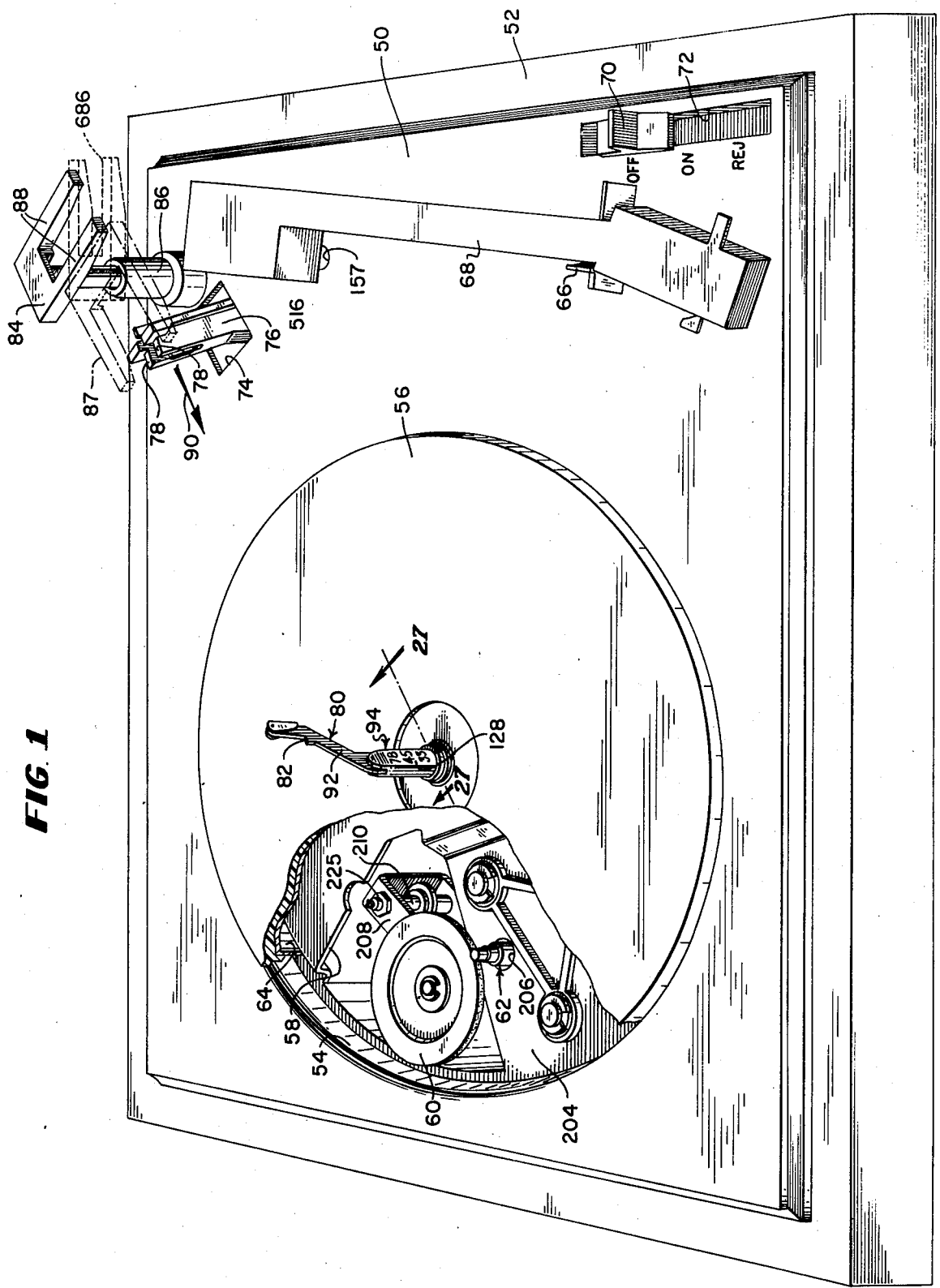
FIG. 1 is a perspective view of a record changer embodying features of the present invention.

Referring now to the drawings, the record changer of the present invention is therein illustrated as comprising a molded base plate 50, on which are mounted all of the operative components of the changer, the base plate 50 being arranged to be mounted within a suitable wooden frame 52, or within the sliding drawer of a cabinet, or the like. The base plate 50 is provided with a sunken well portion 54 which is adapted to receive a rotatably mounted turntable 56, the base plate 50 being provided with a cut out portion 58 through which an idler wheel 60 extends, the idler wheel 60 serving to interconnect a motor driven turret 62 with the downturned rim 64 of the turntable 56 so as to drive this turntable when the idler wheel 60 is held in operative engagement with both the turret 62 and the rim 64.

The main base plate 50 also supports a reset post 66 on which the outer end of a tone arm 68 may be placed either manually or automatically during periods when records are not to be played. A slidably mounted control member 70 extends through an opening 72 (FIG. 2) in the base plate 50 and may be moved from the OFF position shown in FIG. 1 forwardly to an On position and from the ON position further forwardly to a reject position, as will be described in more detail hereinafter.

In accordance with an important feature of the invention, the record changer described herein is arranged to play both 45 rpm 7-inch records and 33-⅓ rpm 12-inch records in an entirely automatic manner and without any adjustment on the part of the operator other than the adjustment of a record supporting platform member to a position suitable for supporting either 7-inch or 12-inch records. More particularly, the base plate 50 is provided with an opening 74 (FIG. 1) through which extends a record-supporting platform member 76 which is provided with a pair of record-supporting ledges 78 which are adapted to support the outer edge of a 12-inch record. At the center of the turntable 56, a flat blade spindle indicated generally at 80 is provided with a record-supporting shelf 82 on which a stack of 12-inch records may be supported.

Figure 2:
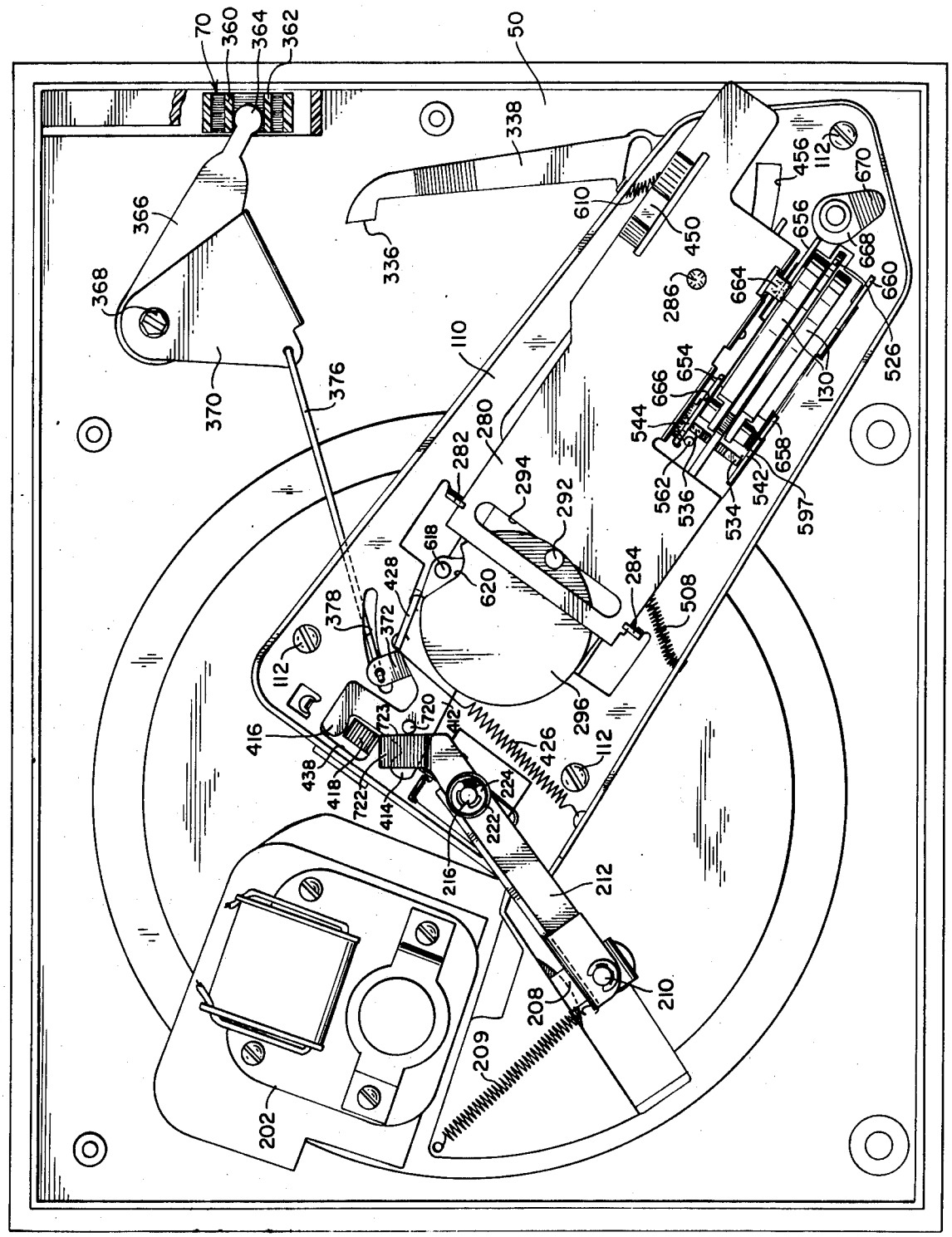
FIG. 2 is a bottom view of the record changer of FIG. 1.

A record hold-down member 84 which is pivotally mounted in a post member 86 provided on the base plate 50, is arranged to be swung from the loading position shown in full lines in FIG. 1 to the position shown in dotted lines at 87 in FIG. 1 and in this position the hold-down member 84 is urged downwardly by means of a spring 702 (FIG. 47) positioned beneath the post 86 so that the underside of the arms 88 of the hold-down member 84 engage the top surface of the uppermost record of the 12-inch stack of records the outer edge of which is supported on the ledges 78.

In accordance with an important feature of the invention, the spindle 80 is not provided with any moving parts for release of a record from the 12-inch stack to the turntable 56 during a record changing cycle. Instead, the platform 76 is bodily moved in the direction of the arrow 90 in FIG. 1 toward the spindle 80 so that the bottommost record of the 12-inch stack of records engages the shoulders 79 (FIG. 35) at the back edge of the ledges 78 and is moved of the record supporting shelf 82 and slides down the inclined portion 92 of the spindle 80 to a record-centering spindle stub member 94 which is provided at the center of the turntable 56.

In accordance with a further aspect of the invention, the platform 76 is arranged to be moved outwardly through the opening 74 in the base plate 50 from the retracted position shown in FIG. 1 to an extended position (FIG. 42) in which the tip of the platform member 76 is moved close enough to the spindle 80 that the recessed portions 96 formed in the upper surface of the platform 76 can act as record supporting ledges for the outer edge of a stack of 7-inch records.

Normally the 7-inch records have a large center opening. When such records are played the blade spindle 80 is arranged to be removed from its receiving slot in the stub spindle member 94 and a large-hole 45 rpm record adaptor member 98 (FIG. 28) is arranged to be inserted within the slot in the member 94 and is provided with a record supporting shelf 100 on which the inner edge of the center opening of the stack of 7-inch large-hole records may rest.

Figure 42:
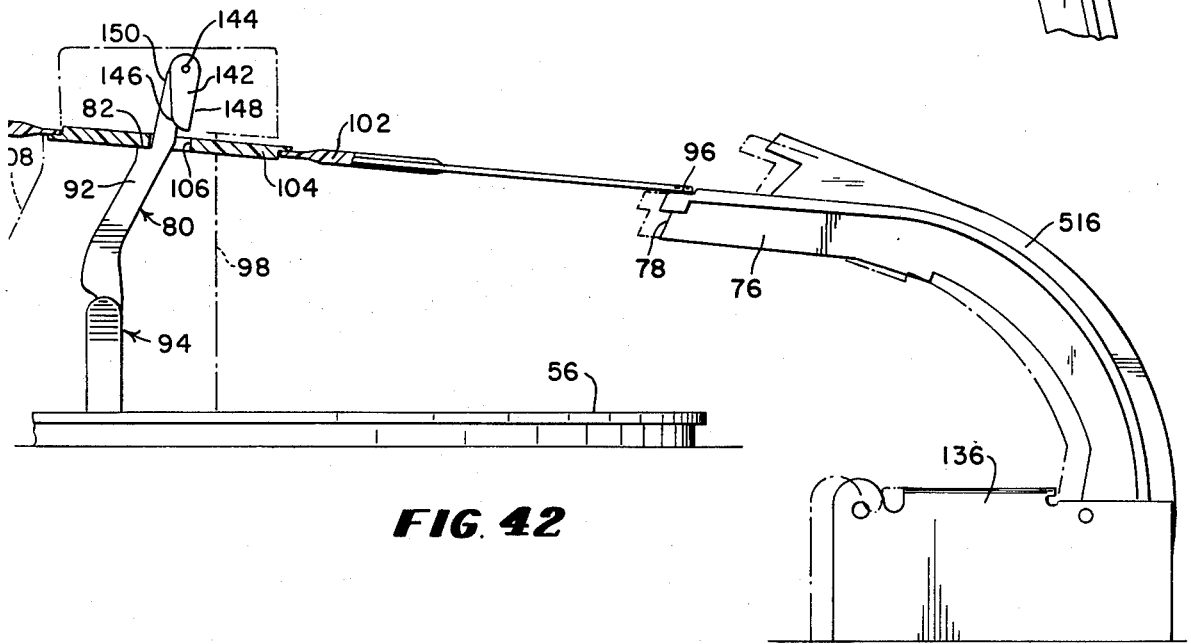
FIG. 42 is a view similar to FIG. 39 but with the record edge supporting platform in its 7-inch record supporting position and shown supporting the edge of a small hole 45 rpm record.

In the alternative, and in accordance with a further aspect of the invention, if a 45 rpm large-hole record, such as the record 102 shown in FIG. 42 is provided with an insert portion 104 so that it has a small center opening 106 corresponding to conventional small hole records, the flat spindle 80 may remain in position on the spindle stube member 94 and the shelf 82 of the spindle 80 will support the edge of the record inserts 104 adjacent the center opening 106 thereof while the outer edge of this stack of small hole 7-inch 45 rpm records can rest on the record supporting ledges 96 of the platform 76, as shown in FIG. 42. Since these records are relatively light and the tip of the platform 76 when in the 7-inch position shown in FIG. 42 is below the shelf 82, no weight is required on the uppermost record and the arms 88 of the hold-down arm 84 may be just long enough to engage the edge of 12-inch records.

The conventional balance arm which is swung over the centering spindle is thus eliminated in accordance with the present invention.

When either the spindle 80 or the large-hole adaptor 98 is employed for 7-inch records, the platform 76 is moved forwardly toward the center of the turntable 56 during the record changing cycle (as shown in dotted lines in FIG. 42), so that the outer edge of the bottommost record of the stack engages the shoulders at the back of the ledges 96 and is moved forwardly off of the record supporting shelf 82, or the record supporting shelf 100 of the adapter 98, whereupon the released record slides down the inclined portion 92 of the spindle 80, or the inclined portion 108 of the adaptor 98 to a position at the center of the turntable 56, as will be described in more detail hereinafter.

In accordance with a further aspect of the invention, when the flat blade spindle 80 is removed and the adaptor 98 is inserted into the spindle stub member 94, the speed of the turntable 56 is thereby changed from its normal speed of 33-⅓ rpm for playing 12-inch records, to a speed of 45 rpm suitable for playing 7-inch large hole records, as will be described in more detail hereinafter. In the alternative, the flat blade spindle 80 may be removed, and the spindle stub member 94 acts as a manual speed control adjustment for changing the speed of the turntable 56 to any desired speed. Thus, with the blade spindle 80 removed, the spindle stub 94 acts to center records placed on the turntable for single record play and the member 94 may be adjusted vertically to provide any desired speed for the turntable. To this end one of the flat sides of the member 94 is provided with suitable indicia corresponding to the turntable speed at different vertical positions of the member 94, as shown in FIG. 1.

Considering now in more detail the above-discussed features of the changer of the present invention, it is first pointed out that the turntable 56, the platform 76, the tone arm 68 and most of the other operative parts of the changer are all mounted on and supported by a main base member 110 (FIG. 2) which is secured to the base plate 50 by means of the screws 112 which are received in suitable bosses provided in the base plate 50. Thus, the turntable 56 is provided with a hub portion 114 (FIG. 7) having an inner sleeve bearing 116 which is rotatably mounted on a fixed sleeve bearing 118 which is secured to the main base member 110, a pair of polished washers 120 which are positioned on opposite sides of the steel balls 122 acting as a support for the bottom end of the turntable bushing 114, the bottom washer being seated on a lower flange portion 124 of the sleeve bearing 118 so that the turntable 56 is freely rotatable about the sleeve bearing 118. The stub shaft member 94 which also acts as a manual speed control, is provided with a pair of flat sides 126 and 128 (FIGS. 1&29) these flat sides being connected by arcuate portions which conform to the inner surface of the sleeve bearing 118. Preferably the flat side 126 and the upper portion of the flat sides 128 are knurled or corrugated to facilitate gripping of the member 94 for adjusting it vertically to different speed control positions.

The platform 86 is provided with an arcuate portion 130 (FIG. 35) which interconnects the free end portion of the platform 76 which extends through the opening 74 in the base plate 50 and a generally right angle portion 132 which is pivotally mounted on a pin 134 carried by a platform carriage 136 which is slidably mounted on the main base member 110. Accordingly, the platform 76 may be pivoted about the pin 134 so that the outer end portion thereof may be moved from the 12-inch record supporting position shown in FIGS. 1 and 35 to the 7-inch record supported position shown in FIGS. 37 and 42 so that the ledges 78 and 96 formed in the tip portion of the platform 76 may be used to support the outer edge portion of the stack of 12-inch records, or 7-inch records, respectively. At a point somewhat before the midpoint of a record changing cycle, the platform carriage 136 is moved forwardly toward the spindle stub 94 from the position shown in full lines in FIG. 39 to the position shown in dotted lines in this figure. When this occurs, and with the platform 76 in a 12-inch record supporting position with a record positioned on the ledges 78, the portion of the ecord which is seated on the shelf 83 of the flat blade spindle 80 is moved forwardly by an amount sufficient to move the edge of the central opening 138 of the bottom 12-inch record 140 beyond the edge of the shelf 82 as shown in FIG. 40 by engagement with the vertical back edge of the ledges 78. As this occurs, the other 12-inch records above the bottom record 140 are retained in their original position by engagement with a U-shaped member 142 which is pivotally mounted on the upper end of the flat blade spindle 80 by means of the pin 144, the bottom end of the member 142 being positioned just slightly more than the thickness of one record above the record supporting shelf 82 so that the member 142 restrains the remaining records in the 12-inch stack while the bottom record is being moved to the position shown in FIG. 40.

Figure 40:
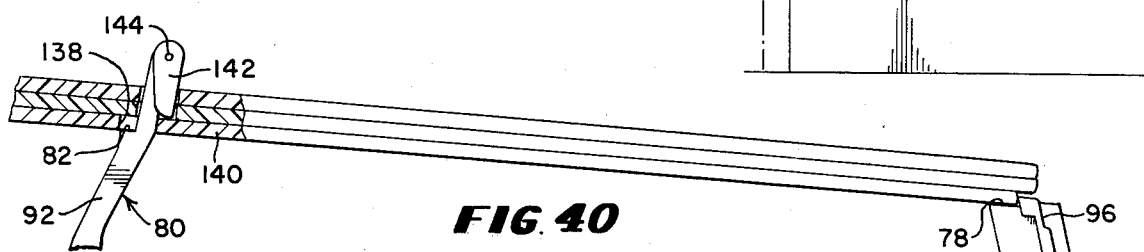
FIGS. 40 and 41 are views similar to FIG. 39 and showing different positions of the mechanism during the dropping of a large diameter record.
Figure 41:
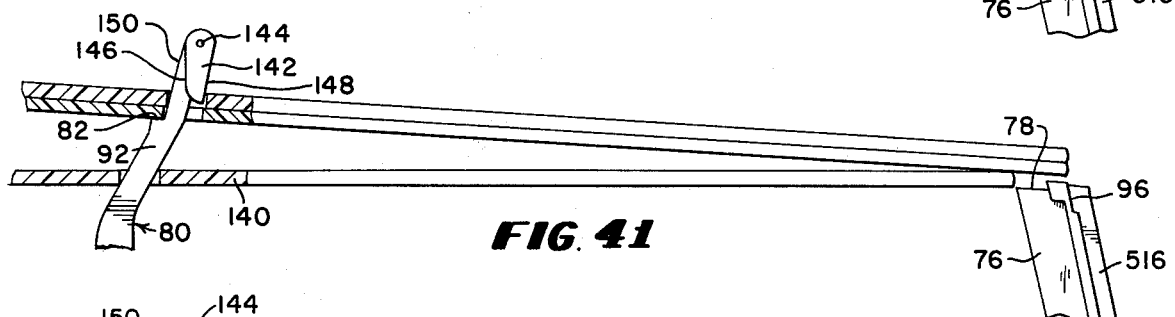

When the platform 76 has been bodily moved to the position shown in FIG. 40, the outer edge portion of the bottom record 140 has not yet been moved off of the supporting ledges 78 at the time that the opening 138 of the record 140 is moved beyond the edge of the shelf 82. However, once the record has been moved free of the shelf 82, it slides down the inclined portion 92 of the flat blade spindle and in so doing the edge thereof is moved beyond the edge of the supporting ledges 78 of the platform 76 to the position shown in FIG. 41. From this point on, the bottom record 140 is free to move on down the spindle 80 and onto the spindle stub member 94 which acts as a centering spindle for the record as it is positioned on the turntable 56.

In a similar manner, when the platform 76 is in the 7-inch record supporting position shown in FIG. 42 and the platform carriage 136 is moved from the position shown in full lines to the position shown in dotted lines in this figure, the bottommost 7-inch 45 rpm record 102 is moved off of the shelf 82 by engagement of the edge of the record with the vertical wall of the ledges 78, while the records above this bottom record are restrained by the member 142 as the bottom record travels down the inclined portion 92 of the spindle 80 the edge portion thereof is moved off of the record supporting ledges 96 and is centered on the turntable 56 by engagement with the member 94.

When it is desired to remove one or more of the records on the turntable 56 after they have been played, the records may be lifted upwardly off the member 94 and up over the flat blade spindle 80, the member 142 pivoting to an upward position shown in dotted lines in FIG. 27 as this occurs by engagement of the top record of the stack with the curved edges 146 of the member 142, the member 142 falling to the position shown in full lines in FIG. 27 by virtue of gravity and the fact that the pivot point of the pin 144 is such that the mass of the member 142 causes it to assume a slightly inclined position with respect to the vertical, as shown in FIG. 27, so that the edge portion 148 of the member 142 cooperates with the opposite edge portion 150 of the upper end of the flat blade spindle 80 to define a pair of record guiding edges which are positioned perpendicularly to the surface of a record supporting on the shelf 82 and the platform 76. In this connection it is pointed out that the flat blade spindle 80 may be very economically manufactured by a simple metal stamping operation and is of extremely low cost compared to present day centering spindles involving moving parts for ejection of a record from the record supporting shelf of the spindle. Also, the member 142 may comprise a very economical stamped sheet metal part which is secured to the upper end of the spindle 80 by means of the pin 144 so that an extremely economical centering spindle arrangement is provided in the record changer of the present invention.

The flat blade spindle may be made even more simply and economically by eliminating the member 148, as shown in FIG. 27A. In this embodiment, the spindle 80a is a flat blade which may be formed in a simple metal stamping operation with the forward and rear edges 148a and 150a of the upper part spaced apart to guide the record stack onto the shelf 82a. An undercut shoulder 146a is provided in the rear edge thereof just slightly more than a record thickness above the shelf 82a.

After records have been played with the spindle 80a they may be removed by simply lifting the spindle out of the slot 250 if the shoulder 146a interferes with removal of the records.

It is also pointed out that normally 45 rpm records are played without an adaptor center portion 104 in which case the 45 rpm adaptor 98 shown in dotted lines in FIG. 42 is employed instead of the flat blade spindle 80. Under these circumstances movement of the platform carriage 136 to the position shown in dotted lines in FIG. 42 moves the bottom large hole 7-inch record beyond the edge of the shelf 100 (FIG. 28) of the adaptor 98. As the record falls it moves along the inclined portion 108 of the adaptor 98 so that the edge portion thereof is moved beyond the record supporting ledges 96 of the platform 76 and thereafter the bottom released record is centered by the bottom portion of the adaptor 98 as it is deposited on the turntable 56. In accordance with an important feature of the invention, the speed of the turntable 56 is automatically shifted to 45 rpm when the adaptor 98 is placed on the spindle stub 94 in place of the flat blade spindle 80, as will be described in more detail hereinafter.

Considering now the manner in which the tone arm 68 is supported on the main base plate 110, a supporting post 152 (FIG. 4) is secured to the base member 110 and a tubular member 154 which is formed integrally with a tone arm index bracket indicated generally at 156, is rotatably mounted on the post 152. The tubular member 154 extends upwardly through an opening 157 (FIG. 1) in the base plate 50 and a tone arm supporting bracket is formed integrally with the tubular member 154 at the upper end thereof and above the upper end 152a (FIG. 5) of the post 152, this bracket including a pair of upstanding wall portions 158 and 160 provided with suitable apertures for receiving a pivot pin 162. The tone arm housing 164 is provided with opposed downwardly extending wall portions 166 and 168, an inwardly extending boss 170 being provided in the wall 166 and a corresponding boss 172 being formed in the wall 168. The pin 162 extends through an opening in the boss 170 and through the wall 166, through the apertures in the members 158 and 160, and into a blind hole in the boss 172 so that the tone arm 68 is pivotally mounted on the upper end of the tubular member 154.

The opening 174 in the wall member 158 is elongated and a set screw 176 is mounted in the tone arm mounting bracket and is provided with a groove 178 which is adapted to receive the upper end 180 of a spring member so that the pin 162 is urged against the end of the set screw 176. Accordingly, the set screw 176 may be adjusted so as to control the angular position of the tone arm 68 with respect to the tubular member 154 so as to provide adjustment of the initial set down position of the tone arm 68. A coil spring 182 is connected between a member 184 which may be adjustably positioned along the length of the tone arm 68 and an upstanding ear portion 186 formed in the tone arm mounting bracket portion on the upper end of the tubular member 154 so as to provide an adjustment of needle pressure on a record positioned on the turntable 56.

In order to control the vertical position of the outer end of the tone arm 68, a lift rod 188 is slidably mounted in a tubular post 190 which is secured to the main base member 110, the upper end of the lift rod 188 engaging a metal plate 192 which is provided with a tongue portion 194 adapted to engage a groove formed in the wall 196 of the tone arm housing, a coil spring 198 being positioned between the top wall of the housing 164 and the plate 192 so that the position of this plate may be adjusted by means of a screw 200 which is threaded into the top wall of the housing 164. Adjustment of the vertical position of the plate 192 thus controls the vertical position of the outer end of the tone arm 68, it being understood that the lift rod 188 is moved upwardly to remove the tone arm from the record during the record changing cycle, as will be described in more detail hereinafter.

Considering now the manner in which the vertical adjustment of the spindle stub member 94 is effective to change the speed of the turntable, it is first pointed out that the turntable motor 202 (FIG. 2) is mounted on the raised central portion 204 of the base plate 50 with the multi-step turret 62 extending through an opening 206 thereof. The idler wheel 60 is rotatably mounted on the end of a lever 208 which is in turn pivotally mounted on a threaded post 210 which is supported in the free end of a lever 212. The other end of the lever 212 is secured to a sleeve member 214 (FIG. 27) which is slidably positioned on the bottom end 216 of the member 94 which extends below the end of the bearing sleeve 118 which is mounted on the main base member 110. The sleeve 214 is provided with an upper flange portion 218 which is urged into engagement with a shoulder 220 (FIG. 28) formed in the bottom portion 216 of the member 94 and a coil spring 222 is positioned between the end of the lever 212 and a washer 224 positioned on the extreme end of the member 216 so that the lever 212 is normally urged into engagement with the shoulder 220. In this position, the level of the idler wheel 60, may be adjusted by adjustment of the nut 225 on the end of the threaded post 210, is arranged to contact the smallest step on the turret 62 so that the turntable 56 is rotated at a speed of 33-⅓ rpm.

In order to provide an indexing or detent arrangement for the three positions of the member 94, a series of notches 226, 228 and 230 (FIG. 30) is provided in the side of the member 94 in the vicinity of the base member 110 and a U-shaped formed wire member 232 is arranged so that one arm 234 thereof is in engagement with one of the notches 226, 228 or 230. A retaining member 236 is provided with a series of upturned lug portions 238, 240 and 242 (FIG. 30) which extend through corresponding openings in the base plate 110 and register the plate 236 so that one arm 234 of the U-shaped member 232 is in engagement with one of the slots 226, 228, 230 and the other arm 244 thereof is positioned in a notch 246 (FIG. 27) formed in the bottom end of the flat blade spindle 80 so that the spindle 80 is detented in the desired position when the end of the spindle 80 is moved downwardly into engagement with the top flange 218 on the sleeve 214, it being pointed out that the flat shank portion 248 of the flat blade spindle 80 is received within a slot 250 formed in the member 94 and extending to a point just above the shoulder 220 thereof. The plate 236 is provided with a pair of transverse strap portions 252 and 254 which retain the arms 234 and 244 of the member 232 in place, this plate also being provided with downturned lug portions 256 and 258 which function to locate the member 232 and prevent it from moving longitudinally.

When it is desired manually to change the speed of the turntable 56 to 45 rpm the upper end of the spindle stub member 94 is grasped by the operator and this member is depressed so that the spring arm 234 is moved out of the notch 226 and is moved into engagement with the notch 228. When this occurs, the lever 212 is now positioned vertically so that the idler wheel 60 is in engagement with the next larger step on the turret 62 so that the turntable 56 is rotated at a speed of 45 rpm. If this manual speed change is made while the flat blade spindle 80 is positioned in the slot 250 the position of the spindle 80 does not change as the member 94 is depressed to the 45 rpm position. This is because the spindle 80 is provided with a flange portion 260 (FIG. 27) which engages the upper end of the bearing sleeve 118 and prevents the spindle 80 from being further inserted into the slot 250. Accordingly, the member 94 simply moves downwardly along the length of the shank portion 248 of the spindle 80 as it is moved to the 45 rpm position. As this occurs, the numerals "33" are depressed below the top of the bearing sleeve 118 so that the operator is informed that the turntable is now operating at 45 rpm since the numbers 33 are no longer visible.

In a similar manner the member 94 may be depressed further so that the spring arm 234 is in engagement with the notch 230 at which point the lever 212 is positioned so that the idler wheel 60 engages the largest step on the turret 62 and the turntable 56 is driven at a speed of 78 rpm. In this connection it will be understood that an additional position can be provided for the member 94 below the indicated "33" position in the event that a speed of 16-⅔ rpm for the turntable 56 is desired, as will be readily understood by those skilled in the art.

If the member 94 is in the 78 rpm position and it is desired to manually shift the speed to 33 rpm, this member 94 is moved upwardly within the bearing sleeve 118 so as to re-position the lever 212 at a point such that the idler wheel 60 will engage the smallest or 33-⅓ rpm step on the turret 62. As this occurs, the spindle 80 is not lifted away from the top of the bearing sleeve 118 since the spring arm 244 functions to retain the spindle 80 in the indicated position by engagement within the notch 246 thereof.

As discussed generally heretofore, the record changer of the present invention is arranged to shift the speed of the turntable 56 automatically to 45 rpm when the 45 rpm adaptor 98 is positioned on the member 94 in place of the flat blade spindle 80. More particularly, the adaptor 98 is provided with a plastic body portion 262 having a depending skirt portion 264 which acts as a centering member for the large hole record when it is deposited on the turntable 56. A flat metal plate 266 is molded into or secured in the body portion 262 of the adaptor 98 and has a shank portion 268 which extends downwardly from the bottom edge of the adaptor 98 and is provided with a shoulder 270 which is arranged to seat on the upper end of the bearing sleeve 118 as the bottom edge portion 272 of the shank 268 is inserted into the slot 250 in the member 94. As the bottom end 272 of the shank portion 268 is inserted into the slot 250 the bottom end thereof strikes the flange portion 218 of the sleeve 214 and depresses this sleeve downwardly on the bottom end portion 216 of the member 94 so that the flange 218 moves away from the shoulder 220 and the lever 212 is positioned so that the idler wheel 60 engages the 45 rpm step on the turret 62. As this occurs, the member 94 is retained in position by engagement of the spring arm 234 with the notch 226. Also, the spring arm 244 is arranged to engage a notch 274 formed in the bottom end portion 272 of the shank 268 of the adaptor 98 so that the 45 rpm adaptor 98 is retained in its depressed 45 rpm position against the force of the coil spring 222. Accordingly, the speed of the turntable 56 is adjusted to 45 rpm whenever the adaptor 98 is positioned on the stub spindle member 94 so that the shank portion 272 thereof engages and depresses the sleeve 214 on the bottom end portion 216 of the member 94. In this connection it will be noted that this shift to 45 rpm is achieved irrespective of whether the member 94 is in the 33 or 45 position at the time the adaptor 98 is inserted. If the member 94 is in the 78 rpm position, then the placement of the adaptor 98 into the slot in the member 94 will be ineffective to cause the turntable speed to shift back to 45 rpm. However, as stated previously, the automatic record changer arrangement of the present invention is arranged basically to play two sizes and speeds of records in a fully automatic manner and the manual speed shift member 94 is provided in the event that single play of a record of any speed including a 78 rpm record is made by removal of either the flat blade spindle 80 or the adaptor 98. It is assumed that the operator will lift the member to the 33 - ⅓ rpm position after a 78 rpm record has been played, in which case the above-described fully automatic operation of the changer as described in detail above will be carried out.

Considering now the manner in which the various operative mechanisms of the record changer of the present invention are moved during a record changing cycle, it is first pointed out that a cycling slide 280 (FIG. 2) is slidably mounted on the main base member 110 by positioning the opposite edges of the cycling slide 280 in notches formed in a pair of downwardly extending flange portions 282 and 284 of the base member 110. A post 286 (FIG. 4) is secured to the other end of the cycling slide 280 with the upper end portion 288 thereof extending through a slot 290 (FIG. 3) formed in the base member 110. The cycling slide 280 is arranged to be reciprocated during the record changing cycle by engagement or a pin 292 (FIG. 2) with the sides of a transverse slot 294 formed in the cycling slide 280, the pin 292 being a part of and depending from a cam plate 296 which is connected to a cycling gear 298 which is rotated one revolution during the record changing cycle. More particularly, a sleeve member 300 is secured to the base member 110 and is provided with an upwardly opening top recess portion 302 which is adapted to receive the hub portion 304 of the cycling gear 298. The cycling gear hub portion 304 is provided with an elongated opening 306 (FIG. 3) at the center thereof which is adapted to receive the correspondingly formed flexible end portions 308 and 310 which are formed in the upper end of the cyclindrical shaft portion 312 of the cam member 296. The end portions 308 and 310 are provided with tapered sides 314 and 316 which define shoulders 318 and 320, respectively, which are arranged to engage the upper surface of the cycling gear 298 when the cam plate shaft portion 312 is inserted into the sleeve 300. With this arrangement, the cycling gear 298 may readily be assembled with the cam plate 296 after the sleeve 300 has been secured to the base member 110, during assembly of the record changer, by simply inserting the flexible end portions 308 and 310 into the opening in the sleeve 300 from the bottom and to such a point that the shoulders 318 and 320 are in engagement with the upper edge of the cycling gear 298. Also, due to the elongated opening 306 provided in the hub portion 304 of the gear 298, the cam plate 296 is automatically registered with the cycling gear 298 so that no additional timing operation between these members is required. In this connection it will be understood that both the cycling gear 298 and the cam plate 296 are preferably made of plastic so that they can be made inexpensively and assembled in the above-described manner in a simple and economical mass production operation.

The cycling gear 298 is intended to be rotated one revolution during the record changing cycle by engagement of the teeth thereof with the teeth of a pinion gear 322 formed in the turntable hub portion 114. However, this pinion gear 322 is normally positioned within a notched portion 334 (FIG. 3) of the cycling gear 298 so that the gear teeth of the gears 298 and 322 do not mesh until a record changing cycle is initiated. To initiate a record changing cycle, a tripping lever 326 is pivotally mounted on a pin 328 formed in the upper surface of the cycling gear 298, one arm portion 330 of the tripping lever 326 having a rubber post 332 secured to the end thereof which extends downwardly through an elongated slot 334 in the cycling gear 298 and is arranged to be engaged by the end surface 336 of an extension arm 338 which is movable with the tone arm 68 during the playing cycle. The tripping lever 326 is also provided with a downturned flange portion 340 (FIG. 3) which extends through an opening 342 in the cycling gear 298 and this lever is also provided with a second downturned flange portion 344 which extends through an opening 346 in the cycling gear 298. The tripping lever 326 is also provided with an upturned flange portion 348 which is adapted to be engaged by a flange portion 350 formed in the turntable hub portion 114 above the pinion teeth 322.

The tripping lever 326 is arranged to be moved at any time during the playing cycle of a record by an amount such that the upturned flange portion 348 thereof is moved into the path of the flange 350. When this occurs, the cycling gear 298 is rotated until the teeth thereof engage the teeth of the pinion gear 322 at which point the cycling gear 298 is driven for one full revolution by engagement with the pinion 322 until the multilated section 324 is encountered at which point driving of the cycling gear 298 is terminated at the end of the record changing cycle.

In accordance with an important aspect of the invention, the cycling gear 298 is preferably formed of plastic and a flexible arm portion 706 thereof is provided one edge of which has a notch adapted to cooperate with a pin 708 which is mounted on the base member 110. By molding the arm 706 with the gear 298, an extremely accurate simple and economical arrangement is provided for detenting the cycling gear 298 in the desired detent position with the gap 324 thereof positioned adjacent the pinion teeth 322, as described in detail heretofore, and without using springs and separate levers as has been done in the past. When a record changing cycle is initiated the arm 706 is flexed as the surface 710 thereof moves by the post 708. Near the end of the record changing cycle the surface 712 of the arm 706 is moved into engagement with the pin 708 and the arm 706 is flexed as the gear 298 is moved to the detent position in which the post 708 is positioned in the notch formed in the arm 706, as shown in FIG. 3. The cycling gear 298 is also provided with a depending flange portion 714 which follows the arcuate contour of the outer edge of the gear 298 in the vicinity of the arm 706 and has a beveled outer surface 716 which prevents the tripping arm 338 from striking the arm 706 as the gear 298 is rotated.

Considering now the manner in which the record changer of the present invention is turned on, i.e., the motor 202 is energized, when the control slide 70 is moved to the ON position shown in FIG. 1, the control slide 70 is formed with a recess defined by a pair of transverse wall portions 360 and 362 (FIG. 2) beneath the main base plate 50 within which is positioned the rounded end portion 364 of a control bracket 366 which is pivotally mounted on a post formed in the base plate 50 and secured by means of the screw 368. The lever 366 is provided with an offset flange portion 370 which is interconnected with an extension arm portion 372 of a control lever 374 (FIG. 24) by means of a control wire 376 which extends over the top of the main base member 110 and downwardly through an elongated slot 378 in the base member 110, the end portion of the wire 376 being formed with an S bend which is positioned in an opening in the end of the arm 372. The control lever 374 is pivotally retained on the end of the sleeve 300 below the main base member 110 by means of a retaining washer 380 and the control lever 374 is provided with a pair of upturned flanges 382 and 384 (FIG. 9) on opposite sides of the pivotal axis thereof which extend upwardly through arcuate slots 386 and 388, respectively, in the main base member 110. The upturned flanges 382 and 384 are arranged respectively to engage the shoulder portions 390 or 392 (FIG. 3) of a reject lever 394 which is slidably mounted between the main base member 110 and the cycling gear 298 (FIG. 32). More particularly, the reject lever 394 is provided with an elongated slot 396 (FIG. 3) near one end thereof which is adapted to be received in a groove formed in a post 398 which is secured to the base member 110. A second elongated slot 400 is provided in the lever 394 in the vicinity of the sleeve 300 so that the reject lever 394 is slidably supported in a groove 402 (FIG. 8) in the sleeve 300 and between the base member 110 and the cycling gear 298. Both of the slots 396 and 400 are provided with enlarged openings 404 and 406, respectively, so that the reject lever 394 may be readily assembled to the post 398 and the sleeve 300 during assembly of the changer. A coil spring 408 is connected between the base member 110 and the end of the reject lever 394 so that this lever is normally biased to the position shown in FIG. 3 wherein a rubber post 410, which is positioned in the forward end of the reject lever 394 and extends upwardly therefrom, is positioned a short distance away from the downturned flange 340 on the tripping member 326 which is carried on the cycling gear 298.

A flat elongated shutoff bar 412 is pivotally mounted on the bottom end of the post 398 beneath the main base member 110 and is provided with a pair of rounded extension arms 414 and 416 which are positioned on opposite sides of the slide button 418 of a slide type ON-OFF switch 432 which is mounted between a pair of downwardly extending flanges 434 and 436 (FIG. 3) on the main base plate 50 and the top of the base plate 110, the switch button 418 extending through an opening 438 in the main base member 110. The control lever 374 is provided with a downturned flange portion 422 which is held in engagement with a flat shoulder 424 on the shutoff bar 412 by means of a coil spring 426. The coil spring 426 has one end thereof connected to a flange on the base member 110 and the other end of the coil spring 426 is connected to a downturned flange portion 428 on the shutoff bar 412. In addition, a coil spring 430 is connected between the down-turned flange 422 on the coil lever 374 and the flange 428 on the shutoff bar 412.

Considering now the operation of the above-described mechanism, when the control slide 70 is moved to the ON position, the bracket 366 is rotated so that the control wire 376 moves the control lever 374 to the position shown in full lines in FIG. 24. When this occurs, the flange 422 engages the shoulder 424 and moves the shutoff bar 412 to the position shown in full lines in FIG. 24. The arm portions 414 and 416 of the shutoff bar 412, which occupy the position shown in dotted lines in FIG. 24 when the control slide 70 is in the OFF position, are thus moved to the position shown in full lines in FIG. 24 and permits the switch button 418, which is internally spring biased to the ON position, to move to the ON position shown in full lines in FIG. 24. Power is thus applied to the motor 202 and the turntable 56 is rotated at a particular speed depending upon the vertical position of the idler wheel 60. In this connection, it should be noted that when the bar 412 is in the OFF position shown in dotted lines in FIG. 24, the shoulder 424 is held against a downturned flange 425 on the base member 110 by the coil spring 426. This in turn forces the control lever 374 to also be positioned in the OFF position so that the arm 372 thereof controls the position of the bracket 366 so that the control slide 70 is also in the OFF position.

Assuming that the changer has now been turned on and that it is desired to initiate a record changing cycle, the control slide 70 may then be moved from the ON position forwardly to the reject position shown in FIG. 1. When this occurs, the control bracket 366 and control wire 276 function to pivot the control lever 374 to the position shown in dotted lines in FIG. 25. As this occurs, the upturned flange 382 of the control lever 374 is moved into engagement with the shoulder 390 on the reject lever 384 and moves this reject lever toward the center of the turntable so that the rubber post 410 strikes the downturned flange 340 on the tripping lever 326 and pivots this tripping lever about the pivot point 328 so that the flange 348 thereof is moved into the path of the flange 350 on the turntable hub 114. As the flanges 350 and 348 engage and the turntable is rotated, the cycling gear 298 is moved so that the teeth thereof then engage the pinion gear teeth 322 and the cycling gear is now moved through one full revolution during a record changing cycle. During this record changing cycle the cycling slide 280 is moved forwardly from its rest position shown in FIG. 2 toward the center of the turntable during approximately the first half revolution of the cam plate 296 (which is connected to the cycling gear 298 in the manner described in detail heretofore) and the cycling slide 380 is returned to its rest position during the last half of the record changing cycle.

Considering now the manner in which the tone arm 68 is lifted off of the record at the beginning of the record changing cycle and is moved outwardly beyond the edge of the record which has been played to permit dropping of the next record, the bottom end of the lift rod 188 normally rests on a flat offset portion 450 of the cycling slide 280 and when this slide is moved forwardly during the first portion of the record changing cycle, the bottom end of the lift rod 188 rides upwardly on an inclined portion 452 of the slide 280 so that an upward force is exerted on the tone arm 68 by the lift rod 188 which pivots the tone arm about the pivot pin 162 and lifts the end of the tone arm off the record.

In order to pivot the tone arm outwardly beyond the edge of the turntable a pin 454 (FIG. 4), which is secured to the tone arm index bracket 156 extends downwardly from this bracket and through an arcuate opening 456 (FIG. 2) in the base member 110 and is pivotally connected to one end of an elongated, flat beryllium copper plate 458. The plate 458 is provided with a slot 460 which extends along the length thereof and a groove 462 (FIG. 4) is provided in the post 286 to a depth approximately equal to the width of the slot 460 during a portion of the length thereof. However, an inwardly directed shoulder 464 is formed in one side of the slot 460 which makes the slot 460 relatively narrow in the vicinity of the shoulder 464 such that the plate 458 will become wedged into engagement with the post 286 at this point. At the extreme outward position of the tone arm. Accordingly, as the cycling slide 280 moves forwardly during the initial portion of the record changing cycle, the post 286 carried thereby will move to a point at which it engages the shoulder 464 and comes into wedging engagement therewith so that further forward movement of the slide 280 picks up the plate 458 and moves it also forwardly so that the tone arm bracket 156 and hence the tone arm 68 is pivoted about the post 152 in the direction to move the end of the tone arm out beyond the edge of the turntable 56. As the tone arm is restrained at the rest post or beyond, continued movement of the slide 280 causes wedging engagement of the shoulder 464 with the post 286 so that the tone arm is frictionally connected to the moving cycling slide 280 and hence when the cycling slide 280 is returned to its rest position during the last half of the record changing cycle the tone arm is also moved inwardly toward the center of the turntable.

In order to provide a suitable arrangement for indexing the set down position of the tone arm 68 for both 7-inch and 12-inch records, the tone arm index bracket 156 is provided with a first stepped portion 470 (FIG. 3) for 7-inch records and a second stepped portion 472 for 12-inch records. The bracket 156 is also provided with a step 474 which is suitable for positioning the tone arm 68 over the rest post 66. The upper arm 476 of a tone arm index pawl indicated generally at 478 is arranged to engage different ones of the steps 470, 472 or 474 on the index bracket 156 and a lower arm portion 430 of the pawl 478 is positioned to engage the upper surface of the cycling slide 280. The pawl 478 is provided with a central bushing 482 which is pivotally and slidably mounted on a pin 484 carried by a pair of upstanding ear portions 486 and 488 formed in the base member 110.

When the cycling slide 280 is in its rest position, as shown in dotted lines in FIG. 12, the pawl 478 is also positioned in the position shown in dotted lines in FIG. 12 wherein the end of the lower arm 480 engages the rear end of the cycling slide 280 and a downwardly extending catch portion 490 formed in the end of the upper member 476 of the pawl 478 is positioned above the plane of the steps 470, 472 and 474 formed in the tone arm index bracket 156, as shown in dotted lines in FIG. 12. Accordingly, the tone arm 68 is free to move during the playing cycle without interference from the catch portion 490 of the pawl 478. However, when a record changing cycle is initiated, the cycling slide 280 moves forwardly during the initial portion of the record changing cycle and permits the pawl 478 to drop downwardly until the bottom surface of the catch portion 490 rides on the upper surface 492 of the tone arm index plate 156. Accordingly, as the tone arm is moved outwardly in the manner described in detail heretofore, the pawl member 476 does not interfere with movement of the tone arm. However, when the tone arm has been moved outwardly to the rest post 66 the pawl member 476 is free to drop downwardly behind one of the steps 470 or 472 depending upon the lateral position of the pawl along the pin 484. As the tone arm is then moved inwardly during the return movement of the cycling slide 280, the tone arm is moved with the cycling slide until the edge portion 494 of the catch 490 engages one of the steps 470, etc. When this occurs, the tone arm index bracket 156 and the tone arm 68 connected thereto is restrained from further inward movement and as the cycling slide continues to move to its rest position, the post portion 286 thereof moves away from the shoulder 464 and does not exert any force on the tone arm through the plate 458 as the cycling slide 280 is returned to the rest position.

When the cycling slide 280 is returned to its rest position as shown in dotted line in FIG. 12 the pawl 478 is moved upwardly so that the catch 490 is above the steps of the index bracket 156 thereby permitting the tone arm to move inwardly over the record during the playing cycle. If the pawl 478 is moved laterally to the position shown in FIG. 11 wherein the pawl member 476 is in alignment with the step 470 then the tone arm 68 will be indexed to engage the lead-in groove of a 7-inch record. If the pawl member is positioned in alignment with the 12-inch step 472 of the index bracket 156, as shown in FIG. 13, then the tone arm is restrained when the edge portion 494 engages the step 472 with the tone arm over the lead-in groove of a 12-inch record.

It will be noted that in these two positions of the pawl member 476, an upstanding flange portion 496 on the tone arm index bracket 156 is positioned so that this flange 496 will engage the outer edge 498 of the catch portion 490 as the tone arm is rotated outwardly and will prevent the tone arm from moving outwardly beyond the rest post 66 as the cycling slide 280 moves to its extreme inward position adjacent the center of the turntable. However, when the pawl member 476 is positioned in line with the rest position step 474 on the tone arm index bracket 156, as shown in FIG. 15, the end 498 of the pawl member 476 is positioned outside of the flange 496 so that the tone arm 68 may move outwardly a substantial distance beyond the rest post 66. In accordance with an important feature of the invention, this movement of the tone arm 68 is employed to establish an automatic shutoff arrangement whereby the record changer may be turned off at the end of the record changing cycle. In the alternative, at any time during a record playing cycle, the tone arm 56 may be lifted off of the record and moved outwardly beyond the rest post 66 and a shutoff arrangement responds by turning off the changer, as will be described in more detail hereinafter.

Considering first the manner in which the index pawl 478 is laterally shifted on the pin 484 to the different positions shown in FIGS. 11, 13 and 15, a pawl control lever 500 (FIG. 22) is pivotally mounted on a post 502 (FIG. 7) which is mounted in the main base member 110 and extends downwardly therefrom. The lever 500 is provided with an offset end portion 504 which is biased into engagement with the surface of a cam hub 506 formed integrally with the cam plate 296, by means of a coil spring 508 which is connected from the lever 500 on the other side of the post 502 to the man base plate 110. The cam hub 506 controls movement of the pawl control lever 500 during the record changing cycle. Thus, when the cycling gear 298 is in the rest position shown in FIG. 2, the cam hub occupies the position shown in FIG. 22. In this position, the opposed curved arm portions 510 and 512 of the lever 500 are positioned so that the arm 510 engages the index pawl 478 which extends through an opening 509 in the base member 110, at a point immediately below the bushing 482 and holds the pawl member 476 in a position in alignment with the rest position step 474 of the tone arm index bracket 156, as shown in FIGS. 22 and 17. Thus, at the start of a record changing cycle, the pawl member 476 is positioned in alignment with the step 474 as the cycling slide 280 moves forwardly and permits this pawl to rotate about the pin 484 so that the bottom edge of the catch portion 490 rests on the surface 492, as described heretofore.

The cam hub 506 is provided with a notched portion 514 and as the cycling gear 298 rotates during the record changing cycle, the cam hub 506 is moved to a point where the notch 514 is in alignment with the end portion 504 of the pawl control lever 500. The coil spring 508 then shifts the lever 500 so that the arm portion 512 of the lever 500 engages the opposite side of the index pawl 478 and shifts this pawl laterally on the pin 484 until the bushing 482 strikes the flange 486. In this position the pawl member 476 is positioned to engage the 7-inch record step 470 on the tone arm index bracket 156 as shown in FIG. 11 and 23.

It will be recalled that the position of the platform 76 is employed to control indexing of the tone arm to either 7-inch or 12-inch records. Accordingly, when the platform 76 is in the position shown in FIG. 7 for support of 12-inch records, a last record sensing member 516, which is curved generally to conform to the shape of the platform 76 and is pivotally mounted on the pin 134 but which is movable independently of the platform 76, as will be described in more detail hereinafter, is provided with an extension arm portion 518 which is positioned immediately beneath the pin 484 and extends upwardly in the path of the bushing 482. Accordingly, if the platform 76 is in the 12-inch record supporting position, the extension arm 518 of the last record sensing member 516 is positioned in the path of the bushing 482 and blocks this bushing in a mid-position shown in FIG. 21 in which position the pawl member 476 is positioned in alignment with the 12-inch step 472 on the tone arm index bracket 156. Thus, even though the coil spring 508 is attempting to move the end portion 504 into the notch 514 of the cam hub 506, the extension arm 518 blocks the pawl and holds the pawl control lever 500 in the mid-position shown in FIG. 21. However, if the platform 76 is in the 7-inch record supporting position, as shown in FIG. 37, the last record sensing member 516 is positioned so that the extension arm 518 thereof is moved away from the pin 484 and permits the pawl control lever 500 to move the index pawl 478 to the 7-inch position shown in FIGS. 11 and 23. In this manner, indexing of the tone arm to either 7-inch or 12-inch records is accomplished automatically by positioning of the platform 76 at the correct plate to receive records of either 7-inch or 12-inch diameter.

During the remainder of the record changing cycle the cam hub 506 continues to rotate and the pawl control member 500 is positioned in a neutral position shown in FIG. 20 in which the arms 510 and 512 thereof are out of engagement with the pawl 478. However, as the record changing cycle terminates the arm 510 of the lever 500 engages the index pawl 478 and moves it back to the rest position shown in FIG. 22 irrespective of where this pawl was positioned during the initial portion of the record changing cycle when the tone arm was indexed to either 7-inch or 12-inch records. This shifting of the pawl 478 does not occur until substantially the end of the record changing cycle after the lift rod 188 has moved down the incline 452 of the cycling slide 280 and lowers the tone arm onto the record.

Considering now the manner in which the last record sensing member 516 is operated to detect either the presence or absence of a record on the record supporting platform 76 in either the 7-inch or 12-inch record supporting position thereof, the platform 76 is provided with a slot 522 within which sensor 516 may move, and has a portion 526 which conforms generally to the shape of the arcuate portion 130 of the platform 76 and a right angle end portion 528 which is pivotally mounted on the pin 134. In addition to the extension arm 518 discussed above, the sensor 516 is also provided with a second extension arm 530 which extends generally parallel to the portion 528 but is offset from the pin 134, as best illustrated in FIG. 35. In order to move the sensor 516 at the appropriate point in the record changing cycle to detect the presence or absence of one or more records on the platform 76, a sensor actuating slide member indicated generally at 532 is slidably mounted in the movable platform carriage 136. More particularly, the sensor actuating slide 532 comprises a pair of downwardly extending leg portions 534 and 536 (FIG. 33), the portion 538 between these leg portions being positioned in engagement with an inclined edge portion 540 of the sensor 516, as best illustrated in FIG. 35. The platform carriage 136 comprises a pair of side walls 542 and 544, the wall 542 having a slot 546 formed therein within which a lug portion 548 of the leg 534 of the sensor actuating slide 532 may ride. The leg 536 is provided with an extension arm portion 550 which rides within a slot 552 formed in the wall 544 of the platform carriage 136. The cycling slide 280 is provided with a pair of flanges 554 and 556 which have inclined edges 558 and 560, respectively, as best illustrated in FIG. 34.

The arm portion 550 of the sensor actuating slide 532 is normally biased into engagement with the upper edge of the flange 554 by means of a coil spring 562 which is connected to the upper edge of the slide 532 and the bottom edge of the wall 544 of the platform carriage 136. The slide 532 is provided with a second extension arm portion 564 which rides in a slot 566 formed in the wall portion 544 so that the slide 532 is guided for vertical movement within the walls 542 and 544 of the platform carriage 136.

Considering now the manner in which the last record sensor 516 is actuated during the record changing cycle, the sensor 516 is located in the rest position shown in full lines in FIG. 35 by engagement of the extension arm 518 with the pin 484 as shown in FIG. 35. When the cycling slide 280 starts to move in the direction of the arrow shown in FIG. 34 at the start of the record changing cycle, the sensor actuating slide 532 starts to move downwardly since the arm portion 550 thereof is continuously biased into engagement with the flange 554 by the spring 562 as the inclined portion 558 thereof is encountered. Accordingly, as the slide 532 moves downwardly at the start of a record changing cycle the portion 538 thereof engages the inclined edge 540 of the sensor 516 and pivots the sensor about the pin 134. The tip portion 524 of the sensor 516 is normally positioned in alignment with the top edge of the platform 76, as shown in FIG. 35, before the record changing cycle is initiated. However, as the sensor 516 is pivoted about the pin 134 the tip portion 524 thereof is raised upwardly as the sensor 516 is pivoted until the tip 524 strikes the edge of a 12-inch record resting on the supporting ledges 78 of the platform 76, as shown in FIG. 36. When the tip portion 524 thus engages the edge of a record on the ledges 78, the sensor actuating slide 532 is prevented from further downward movement against the biasing force of the spring 562 which tries to urge the arm 550 into engagement with the incline 558. However, if no 12-inch record is present on the record supporting ledges 78 the pivotal movement of the sensor 516 about the pin 134 is not blocked by engagement of the tip 524 thereof with a record and as the sensor actuating slide 532 continues to move downwardly along the inclined edge 558 of the slide 280, the sensor 516 is pivoted to the position shown in dotted lines in FIG. 35 as the portion 538 of the slide 532 moves down the complete incline 540 and onto the flat edge portion 570 thereof, it being understood that pivotal movement of the sensor 516 to the position shown in dotted lines in FIG. 35 is caused by engagement of the portion 538 of the slide 532 with the inclined edge 540 as the slide 532 moves down the incline 558 due to the biasing force of the spring 562.

When the slide 532 has been moved to the bottom of the incline 558 the extension arm 564 thereof is moved downwardly to the position shown in dotted lines in FIG. 33. At the start of the record changing cycle the extension arm 564 is positioned well above the pawl member 476. Furthermore, if the tip 524 of the sensor 516 is blocked by a record, as shown in FIG. 36 the extension arm 564 is moved downward only slightly and does not interfere with lateral shifting of the index pawl 478 to the 7-inch and 12-inch positions as described in detail heretofore. However, if no 12-inch record is present on the supporting ledges 78 and the sensor 516 is moved to the position shown in dotted lines in FIG. 35 the arm 564 moves downwardly by an amount such that the end thereof is positioned in line with the pawl member 476 as shown in dotted lines in FIG. 12. Furthermore, the arm portion 564 is moved to this downward or shutoff position where it can block the pawl member 476 before the end portion 504 of the pawl control lever 500 engages the notch 514. Under these conditions the member 564 blocks lateral shifting of the index pawl 478 to either the 7-inch or 12-inch position during the period when the notch 514 is encountered by the end 504 of the lever 500, as shown in FIG. 19. When the pawl member 476 is thus held in a position in alignment with the rest step 474 the tone arm index bracket 156 is permitted to move to the position shown in FIG. 15 while the tone arm 68 moves outwardly beyond the rest post 66. This outward movement of the tone arm 68 beyond the rest post 66 is employed to actuate a shutoff mechanism, as will be described in more detail hereinafter, at the end of the record changing cycle. In this connection it will be noted that the sensing of the presence of a record on the ledges 78 by the tip 524 of the sensor 516 is performed at the start of the record changing cycle and well before the platform carriage 136 is bodily moved forwardly to cause the ejection of a record in the manner described above at approximately the mid-point of the record changing cycle. Accordingly, even though the arm 550 of the slide 532 then encounters the inclined portion 560 of the flange 556 (FIG. 34) so that the sensor 516 is moved away from the edge of the record on the ledges 78, the index poawl 478 has already been indexed to a 7-inch or 12-inch position in which positions the flange 496 on the index bracket 156 prevents the tone arm from moving outwardly beyond the rest post position so that no shut-off adjustment is set up. Furthermore, as the arm 550 rides back down the incline 560 and up the incline 558 during the last half of the record cycle, after the record has been removed from the ledges 78, the movement of the slide 532 and corresponding actuation of the sensor 516, as the inclined edges 560 and 558 are encountered by the arm 550, is no longer of any effect with regard to automatic shutoff since the tone arm is moving inwardly from the rest post position during this portion of the cycle.

Considering now the manner in which the sensor 516 is actuated by the portion 538 of the slide 532 when the platform 76 is in the 7-inch record supporting position shown in FIG. 37, when the portion 538 is in its uppermost position shown in FIG. 37, the tip 524 of the sensor 516 is positioned a substantial distance away from the record supporting ledges 96 which are employed to support the edge of a 7-inch record. During the record changing cycle the portion 538 of the sensor actuating slide 532 engages the edge 529 of the arm 530 of the sensor 516 and pivots the sensor 516 about the pin 134 as the slide 532 moves downwardly along the incline 558, as described heretofore. If a stack of 7-inch records is positioned on the ledges 96, as shown in FIG. 44, the tip 524 moves inwardly and downwardly until the end 572 thereof strikes the edge of the next to bottom record in the record stack. The slide 532 is then prevented from further downward movement, as described heretofore. Since this record cannot move laterally due to the shoulder 576 on the adaptor 98, or the member 142 on the spindle 80, the sensor 516 does not cause the ejection of a 7-inch record. If only a single record is present on the ledges 96, the tip 524 moves downwardly into engagement with the upper surface of the record edge, as shown in FIG. 43, and effectively pinches the record against the ledges 96. This action is necessary to prevent the end 572 of the tip portion 524 from engaging the outer edge of the single record since it might cause ejection of the record rather than sensing the presence of this record on the ledges 96. On the other hand, when a number of 7-inch records are on the ledges 96, the end 572 may strike the next record from the bottom and not cause ejection of any records because the next record from the bottom cannot move under the shoulder 572 (FIG. 28) provided on the adaptor 98 but instead strikes the outer edge 576 of this adaptor so that no ejection of records is caused by movement of the sensor 516. A similar situation would occur if small hole 7-inch records are played since the second record from the bottom would engage the member 142 on the flat spindle 80 and hence movement of the sensor edge 572 (FIG. 44) to detect the presence of a record on the ledges 96 would not cause undesired ejection of the bottom record.

If no 7-inch record is present on the supporting ledges 96 the sensor 516 continues to be pivoted about the pin 134 as the portion 528 of the sensor actuating slide 532 moves downwardly along the shoulder portion 531 on the arm 530 so that the sensor is moved to the position shown in dotted lines in FIG. 37 at which position the tip 524 is well below the level of the record supporting ledges 96, thereby indicating the absence of a record on these ledges. This downward movement of the slide 532 again takes place during the initial portion of the record changing cycle and the arm portion 564 of the slide 532 is again moved into blocking relationship to the pawl member 476 and restrains the pawl 478 in the position shown in FIG. 19 so that a shutoff adjustment is initiated in the same manner as described in detail heretofore in connection with sensing the absence of a 12-inch record on the ledges 78.

Considering now the manner in which the platform 76 may be moved between its 7-inch and 12-inch record supporting positions, a latching pin 578 is positioned between the two walls 542 and 544 of the platform carriage 136, as best illustrated in FIG. 38. The end of the pin 578 extends through a slotted opening 580 in the wall 542 and a coil spring 582 is connected between the end of the pin 578 and the wall 542 so that this end of the pin is normally urged into one end of the slot 580. The platform 76 is provided with a flange portion 584 which defines a shoulder which can rest against the pin 578, as shown in FIG. 36. When this shoulder is in engagement with the pin 578 the record supporting ledges 78 are correctly positioned vertically for support of the outer edge of the 12-inch record. The platform 76 is also provided with a second flange portion 586 which provides a shoulder 588 which may be used to position the platform 76 properly for support of 7-inch records. Accordingly, the tip of the platform 76 may be grasped by the operator and pulled outwardly so that the platform 76 is pivoted about the pin 134 until the shoulder 588 is moved into engagement with the pin 578, as shown in FIG. 37, in which position the ledges 96 are correctly positioned for support of 7-inch records. In this connection it will be noted that as the platform 76 is moved upwardly and the inclined portion of the flange 586 engages the pin 578 this pin is cammed outwardly against the force of the spring 582 until the pin snaps behind the shoulder 588 to latch the platform 76 in the 7-inch record supporting position.

As the platform 76 is moved to the 7-inch record supporting position a web portion 590 (FIG. 36) thereof, which interconnects the two sides of the platform 76 in the area of the arm portion 132, engages a camming shoulder 592 provided on the sensor 516 so that the sensor 516 is also pivoted about the pin 134 and is carried with the platform 76 as it is moved to the 7-inch record supporting position so that the sensor 516 occupies the position shown in full lines in FIG. 37 when the platform 76 is in the 7-inch record supporting position. In this position the pin 578 is positioned in engagement with the inclined shoulder portion 594 of the shoulder 592 so that the sensor 516 is also held in the position shown in full lines in FIG. 37 by the pin 578.

Considering now the manner in which the platform 76 may be retracted back to the 12-inch record supporting position, the tip 524 of the sensor 516 is grasped by the operator and moved in the direction of the arrow 596 shown in FIG. 37. When the sensor 516 is thus moved, the shoulder portion 594 thereof engages the pin 578 and cams the outer end thereof to the forward end of the slot 580 against the force of the spring 582 so that this pin is moved beyond the edge of the flange 586 on the platform 76. When this occurs the platform 76 is released and falls of its own weight back to the 12-inch position shown in FIG. 35. A coil spring 597 positioned around the pin 134 and having one end under the top wall of the carriage 136 and the other end over the portion 132 of the platform 76 can also be provided to hold the platform 76 in a retracted position when the changer is transported in a vertical plane. The sensor 516 is also moved past the pin 578 and when it is released by the operator falls of its own weight to the position shown in full lines in FIG. 35 in which position the portion 538 of the sensor actuating slide 532 is in engagement with the inclined edge 540 of the sensor 516.

Considering now the manner in which the automatic shutoff of the changer is accomplished in response to movement of the tone arm outwardly beyond the rest post 66 as described generally heretofore, the shutoff bar 412 is provided with an elongated arm 600 (FIG. 24) which terminates in a downturned end flange 602. A bracket 604 is pivotally mounted on a portion 606 of the post 152 which extends below the base member 110, the bracket 604 being retained in place on the post portion 606 by means of the retaining washer 608. A coil spring 610 is connected between the bracket 604 and a flange of the base member 110 so that the surface 612 of the bracket 604 is urged into engagement with the end flange 602 of the shutoff bar 412 when this bar is in the position shown in full lines in FIG. 24. The bracket 604 is also provided with an offset surface 614 so as to define a shoulder between the surface 612 and 614 which latches the shutoff bar 412 in the ON position against the force of the strong coil spring 426. Accordingly, once the changer has been turned on by movement of the control slide 70 to the ON position as described in detail heretofore, and the bar 412 has been moved to the full line position shown in FIG. 24, this shutoff bar will remain in the ON position shown in FIG. 24 unless the end flange 602 thereof becomes unlatched from the shoulder between the surfaces 612 and 614 on the bracket 604.

If the tone arm is now moved outwardly beyond the rest post 66 during a playing cycle, the downwardly extending post 454, which is secured to the tone arm index bracket 156 and moves therewith, engages the extension arm 616 of the bracket 604 and pivots this bracket about the post 606 and against the force of the spring 610. When this occurs, the end flange 602 is removed from the shoulder on the bracket 604 between the surfaces 612 and 614 so that the shutoff bar 412 is pivoted about the post 398 to the position shown in dotted lines in FIG. 24 by the spring 426. As this occurs, the arm 416 of the shutoff bar 412 moves the switch button 418 to the OFF position against the force of the internal spring in this switch so that the changer is then immediately turned off and the turntable 56 is stopped.

The shutoff bar 412 is provided with a post 720 (FIG. 2) which engages an inclined edge 723 of the flange portion 722 of the lever 212. When the shutoff bar 412 is moved to the ON position shown in full lines in FIG. 24, this movement of the post 720 permits the idler wheel 60 to be moved into engagement with the turntable 56. However, when the shutoff bar 412 is move to the OFF position the post 720 engages the edge 723 of the flange 722 and pivots the lever 212 so that the idler wheel 60 is moved out of engagement with both the turntable rim 64 and the turret 62.

AS described generally heretofore, the tone arm is also permitted to move beyond the rest post during the record changing cycle following playing of the last record, when the sensor 516 senses the absence of a record on the ledges 78 or 96 and blocks the index pawl in the position shown in FIG. 19. However, in accordance with a further feature of the invention the changer is not turned off at this point during the record changing cycle but instead the record changing cycle is completed before the shutoff bar 412 is permitted to move to the OFF position. To this end, a post 618 is provided on the shutoff bar 412 and extends downwardly to the level of the cam plate 296. The cam plate 296 rotates with the cycling gear 298 during the record changing cycle and is provided with a notched portion 620 (FIG. 2) in the periphery thereof. When the cycling gear 298 is moved to the rest position at the end of the record changing cycle the notch 620 is positioned opposite the post 618 so as to provide clearance for pivotal movement of the shutoff bar 412 to the OFF position shown in dotted lines in FIG. 24. However, after the bracket 604 has been pivoted in response to outward movement of the tone arm beyond the rest post 66 at approximately mid-cycle, and the end flange 602 has thus been unlatched from the shoulder between the surfaces 612 and 614 of the bracket 604, the shut-off bar 412 is pivoted only slightly until the post 618 engages the periphery of the cam plate 296. Accordingly, for the remainder of the record changing cycle the post 618 prevents the shutoff bar 412 from being moved to the OFF position shown in dotted lines in FIG. 24. However, when the cycle is completed and the notch 620 is moved into the vicinity of the post 618 the spring 426 is then able to pivot the shutoff bar 412 to the OFF position and move the switch button 418 to the OFF position as described in detail heretofore. In this connection it will be noted that the shutoff bar 412 is only unlatched and permitted to move to the OFF position at the end of a record changing cycle when the tone arm 68 has been moved outwardly beyond the rest position. Thus, when the control slide 70 is moved to the reject position so that the shutoff bar 412 is pivoted to the position shown in dotted lines in FIG. 25 the end flange 602 of the bar 412 merely moves outwardly along the surface 612 of the bracket 604 and when the control slide 70 is released by the operator the spring 426 functions to pivot the bar 412 back to the position shown in full lines in FIG. 25 in which position the end flange 602 is in engagement with the shoulder between the surfaces 612 and 614 on the bracket 604. This return of the shutoff bar 412 to the full line position of FIG. 25 also causes the control lever 374 to move back to the full line position shown in FIG. 25 since the flange 422 thereof is in engagement with the shoulder 424 on the bar 412. As a result, the control wire 376 returns the control slide 70 to the ON position after it has been moved to the reject position and released by the operator.

As discussed in detail heretofore, an automatic shutoff of the changer is accomplished either in the record changing cycle following playing of the last record as determined by the position of the sensor 516, or by movement of the tone arm 68 manually out beyond the position of the rest post 66 at any time during a playing cycle. In addition, and in accordance with a further feature of the invention, the changer may be turned off by simply moving the control slide 70 to the OFF position. Movement of the control slide 70 to the OFF position does not immediately cause the changer to be shut off, but instead a reject operation is initiated whereby an automatic record changing cycle is started. At the same time, the index pawl 478 is blocked in the rest post position shown in FIGS. 15 and 19 so that at the end of this record changing cycle the changer is automatically shut off. Thus, referring to FIG. 26, when the control slide 70 is moved to the OFF position, the control wire 376 moves the end 372 of the control lever 374 to one end of the slot 378 so that the lever 374 is pivoted about the sleeve 300 to the position shown in full lines in FIG. 26. However, since the end flange 602 of the shutoff bar 412 is still latched against the shoulder between the surfaces 612 and 614 on the bracket 604 by the strong spring 426, the control lever 374 is pivoted to the position shown in FIG. 26 while the shutoff bar 412 remains latched in the ON position shown in full lines in FIG. 26, the coil spring 430 stretching to permit this movement of the control lever 374.

Pivotal movement of the control lever 374 to the position shown in FIG. 26 causes the upturned flange portion 384 thereof to engage the shoulder 392 of the reject lever 394 and move this lever forwardly from the position shown in full lines in FIG. 32 to the position shown in dotted lines in this figure. This movement of the reject lever 394 moves the rubber post 410 thereof into engagement with the downturned flange 340 on the tripping member 326 and pivots this lever 326 so that the flange 348 thereof is engaged by the flange 350 on the turntable hub 114 and a record changing cycle is initiated, as described in detail heretofore.

This same pivotal movement of the control lever 374 also causes the upturned flange portion 382 thereof to engage the edge 632 (FIG. 9) of an arcuate opening 634 in a shutoff slide 636 which is slidably mounted on the base member 110 so that this slide is moved from the position shown in full lines in FIG. 9 to the position shown in dotted lines in this figure. The slide 636 is provided with a downturned flange 638 which rides within a slot 640 formed in the base member 110 and is provided with a second downturned flange 642 at the other end thereof which rides in a slot 644 also formed in the base member 110 so that the slide 636 is guided for sliding movement from the position shown in full lines in FIG. 9 to the position shown in dotted lines in this figure by these flanges, these flanges having extension portions 646 and 648, respectively, which are positioned beneath the base member 110 so as to retain the slide 636 loosely in place on the base member 110.

An upturned flange 650 is provided on the end of the slide 636 and when this slide is moved to the position shown in dotted lines in FIG. 9 the flange 650 is moved to a position adjacent the end of the bushing portion 482 of the index pawl 478 so that the member 476 thereof is blocked in the position shown in FIG. 9 which corresponds to the position of this pawl shown in FIGS. 15, 17 and 19 in which position the tone arm 68 is permitted to move beyond the rest post 66. When this occurs the post 454 carried by the index bracket 156 is effective to unlatch the end flange 602 of the shutoff bar 412, as described in detail heretofore in connection with FIG. 24. Since the tone arm is moved out beyond the rest post during a record changing cycle the post 618 on the bar 412 is in engagement with the periphery of the cam plate 296 so that the shutoff bar is not moved to the OFF position shown in dotted lines in FIG. 24 until the end of the record changing cycle when the post 618 is opposite the notch 620 so as to permit the spring 426 to move the bar 412 to the OFF position. In this connection it will be noted that when the control lever 374 is moved to the position shown in FIG. 26 to effect a reject operation as described above, the control slide 70 is moved slightly beyond the indicated OFF position in FIG. 1 to accomplish the above-described movement of the reject lever 394 from the position shown in full lines in FIG. 32 to the position shown in dotted lines thereof. However, once the shutoff bar 412 has been returned to the OFF position in which the surface 424 engages the lug 425 on the base member 110, the spring 430 is effective to move the flange 422 of the control lever 374 back against the shoulder 424 so that the control wire 376 returns the slide 70 to the OFF position shown in FIG. 1 and the tone arm 68 is positioned on the rest post 66.

When the record changer of the present invention has been turned off by movement of the control slide 70 to a point slightly beyond the OFF position so as to effect the above-described reject operation and movement of the shutoff slide 636 to the position shown in dotted lines in FIG. 9, this slide remains in this position after the machine uas been shut off. However, when the machine is again turned on and the control slide 70 is moved from the ON position to the forward reject position to initiate a record changing cycle as described above, the flange 382 engages the other end 652 of the slot 634 in the slide 636 and moves this slide back to the position shown in full lines in FIG. 9 in which position the end flange 650 thereof is moved out of the path of travel of the pawl bushing 482. Accordingly, the pawl 478 is then free to be set to either a 7-inch or 12-inch position, as described in detail heretofore, so that the slide 636 does not interfere with operation of the changer during the playing of records.

Considering now the manner in which the platform carriage 136 is moved forwardly just slightly before the midpoint of the record changing cycle so that the platform 76 carried thereby moves the buttom record of the supported stack of records off of the shelf 82 of the flat blade spindle 80, or the shelf 100 of the adaptor 98, the walls 542 and 544 of the platform carriage 136 are each provided with a pair of offset retaining feet which are positioned beneath the base member 110 and function to prevent the carriage 136 from being lifted upwardly when the platform 76 is moved between the 7-inch and 12-inch positions. Thus, the wall 544 is provided with the feet 654 and 656 (FIG. 2) and the wall 542 is provided with the feet 658 and 660. The carriage 136 is thus slidably mounted on the base member 110 and is biased to a rearward position on the base member 110 by means of the coil spring 562 (FIG. 3). The cycling slide 280 is provided with a sidewardly projecting flange 664 (FIG. 2) and when the cycling slide has been moved toward the center of the turntable to somewhat before the mid-point of the record changing cycle the edge of the flange 664 engages an edge 666 (FIG. 2) on the post 654 of the carriage 136 and moves this carriage forwardly toward the center of the turntable to the position shown in dotted lines in FIGS. 39 and 42 so that the bottom record of the supported stack of records is moved off of the shelf of the center spindle 80 or adaptor 98 as the case may be.

Figure 39:
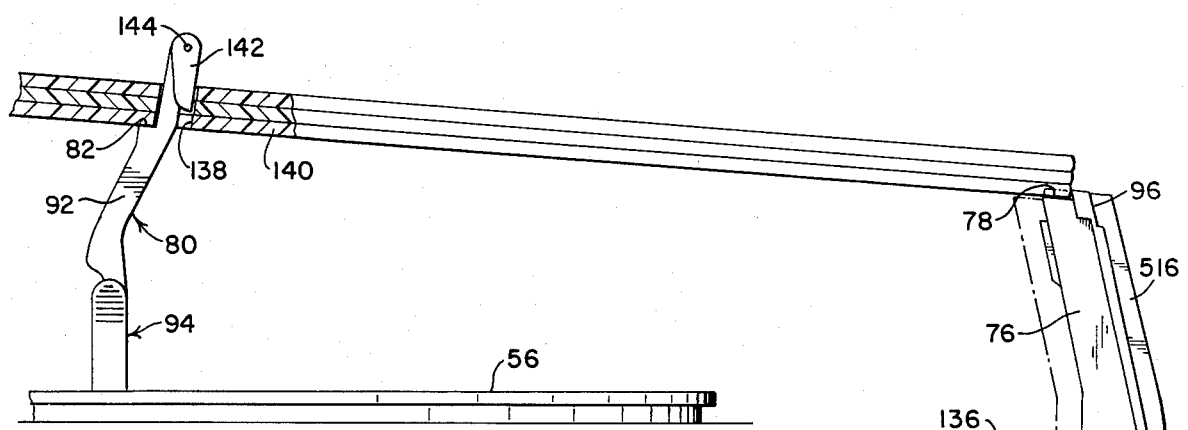
FIG. 39 is a simplified right side view of the changer of FIG. 1 with a stack of records on the supporting spindle and platform of the changer.

As the cycling slide 280 returns to its rest position the spring 662 returns the carriage 136 to its rearward position, shown in full lines in FIGS. 39 and 42, and the flange 664 then moves away from the edge 666 of the carriage foot 654 as the slide returns to its rest position. In order to position the carriage 136 properly for edge support of either 7-inch or 12-inch records, while at the same time accommodating various manufacturing tolerances in the assembled parts, a metal cam plate 668 is snugly riveted to the base member 110 in such manner that the plate 668 may be rotated by grasping an upstanding tab portion 670 thereof and the plate 668 remains in adjusted position after it has been rotated. If desired, a bowed spring washer may be provided between the rivet head and the plate 668 to control the friction between these members. The eccentric surface of the plate 668 acts as a stop for the rear leg 656 of the carriage 136 and by rotating the cam plate 668 the position of the carriage 136 and hence the record supporting ledges 78 or 96 of the platform 76 may be adjusted to the required position of the carriage suitable for supporting a stack of 12-inch or 7-inch records.

Considering now the manner in which the tripping arm 338 is arranged to provide an automatic initiation of a record changing cycle after a record has been played, the tone arm index bracket 156 is provided with an arcuate slot 672 and the arm 338 is provided with a corresponding arcuate slot 674 to provide clearance for the lift rod 188 and post 190 so that the tone arm 68 may be rotated throughout its range of travel without striking the post 190. The tripping arm 338 rests on the upper surface 676 of the tone arm index bracket 156 and a collar member 678, which acts as a weight, rests on the end of the arm 338 so as to provide a predetermined friction between the underside of the arm 338 and the surface 676, the member 678 being loosely retained in place by the retaining washer 680.

The arm 338 is moved outwardly with the tone arm 68 to the position shown in dotted lines in FIG. 3 when the tone arm is positioned over the rest post 66. The arm 338 also moves with the tone arm as it is indexed to a 7-inch or 12-inch record and continues to move with the tone arm as the record is played. When the needle is near the end of the recorded grooves, the end surface 336 of the arm 338 moves into contact with the rubber post 332 and causes a slight pivotal movement of the tripping lever 326 each revolution of the record because of the spiral recorded grooves. This slight movement of the member 326 tends to bring the flange 348 more directly into the path of the flange 350. However, since the flange 348 is positioned at a slight angle, the flange 350 strikes the outer surface of the flange 348 and moves the lever 326 backwardly each time the turntable carrying the hub 114 makes a revolution. This situation continues without initiation of a tripping cycle until the wider spaced runout groove of the record is encountered by the tone arm 68 at which point the arm 338 moves with the tone arm a greater distance in one revolution of the turntable and by an amount such that the flange 348 is moved into the path of the flange 350 during one revolution of the turntable so that a record changing cycle is initiated in the manner described in detail heretofore.

As this record changing cycle progresses it is also necessary to reset the tripping member 326 so that it is moved back to its initial position in which the post 332 is near the end 682 of the slot 334. This resetting of the tripping member 326 is accomplished by providing a shoulder portion 684 on the member 326 which is engaged by the pinion teeth 322 near the end of the record changing cycle as the cycling gear 298 has completed almost one full revolution. As the pinion teeth 322 engage the shoulder 684 the tripping member 326 is moved back to the position shown in full lines in FIG. 3. The tripping member 326 is thus repositioned so it can be moved either by engagement with the arm 338 during a playing cycle or by forward movement of the reject lever 394, as described in detail heretofore. In this connection it will be understood that the side of the opening 346 functions to limit pivotal movement of the tripping member 326 at the start of a record changing cycle when the flange 350 engages the flange 348 on the tripping member 326, as shown in FIG. 6.

As described generally heretofore the flat blade spindle 80, or the adaptor 98 may be removed from the spindle stub 94 and a single record may be manually placed on the turntable 56 and centered by the stub 94 in simulation of a conventional turntable arrangement. In accordance with an important feature of the present invention, facilities are provided for automatically playing a single record manually deposited on the turntable 56, returning the tone arm 68 to the rest post 66 and shutting the changer off even though no record is supported on the supporting ledges 78 or 96 of the platform 76. Furthermore, a single record manually positioned on the turntable 56 may be played repeatedly by simply moving the hold down arm 84 to the position shown in dotted lines in FIG. 1 at 686, a position which is somewhat beyond the loading position shown in full lines in FIG. 1.

Considering first the manner in which a single record may be manually placed on the turntable 56 and played once automatically after which the changer is turned off, a shutoff disabling lever 688 (FIG. 45) is pivotally mounted adjacent the wall 544 of the platform carriage 136 on the end of the pin 134 which also pivotally mounts the platform 76 and sensor 516. The lever 688 is provided with an inclined edge 690 which is positioned in the path of the arm portion 564 of the sensor actuating slide 532, as best illustrated in FIG. 45. Also, the lever 688 is provided with an offset flange 692 at the other end thereof which is positioned on the opposite side of the wall 544 and functions loosely to retain the lever 688 along the wall 544 for pivotal movement about the pin 134.

It will be recalled from the preceding description that when a record changing cycle is initiated with one or more records supported on the platform 76, the sensor 516 is moved only until the tip portion 524 thereof strikes the edge of a record and when this occurs the sensor 516 blocks further downward movement of the slide 532 so that the arm 564 cannot be positioned to block the index pawl member 476 in the rest position and the pawl 478 may then be laterally shifted to either the 7-inch or 12-inch position depending upon the position of the platform 76. On the other hand, if no records are present on the platform 76 the sensor 516 is pivoted about the pin 134 by downward movement of the slide 532 and this downward movement of the slide 532 continues to a point at which the arm 564 thereof is positioned to block the pawl member 476 in the rest position and permit the tone arm 68 to move outwardly beyond the rest post 66 so that the shutoff bar 412 is unlatched, as described in detail heretofore in connection with FIG. 24.

Since no records are supported on the platform 76 when a record is manually positioned on the turntable 56 for single record play, it is necessary to block downward movement of the sensor actuating slide 532 so that the arm 564 thereof will not block the index pawl member 476 in the rest position. To this end, the shutoff disabling lever 688 is provided with an out-turned flange portion 694 which is positioned immediately beneath a projecting lug portion 696 provided on the tone arm index plate 156 when the tone arm 68 is positioned on the rest post 66. Accordingly, after a record is manually positioned on the turntable 56 with the tone arm on the rest post 66 and the control slide 70 is moved forwardly past the ON position to the reject position to initiate an automatic record changing cycle, the lug 696 is positioned above the flange 694 on the lever 688 so that this lever is restrained from upward movement during the initial portion of the record changing cycle when the sensor actuating slide 532 would normally move downwardly and the arm 564 would block the index pawl member 476. When the lever 688 is thus restrained in the position shown in FIG. 45 the inclined edge 690 thereof prevents the slide 532 from moving downwardly by an amount sufficient to position the arm 564 thereof in blocking relation to the index pawl member 476. Accordingly, the index pawl 478 is indexed to a position corresponding to the position of the platform 76 and the tone arm 68 is moved into engagement with the lead-in groove of the record on the turntable 56 automatically. After this record is played another record changing cycle is initiated by the velocity tripping arm 338, as described above. However, during the initial portion of this record changing cycle, the tone arm 68 is positioned near the center of the turntable 56 so that the lug portion 696 on the torn arm index bracket 156 is no longer positioned above the flange 694 on the lever 688. Accordingly, the sensor actuating slide 532 may now move downwardly during this record changing cycle and simply pivots the lever 688 about the pin 134 while at the same time positioning the arm 564 thereof in blocking relation to the index pawl member 476. An automatic shutoff record changing cycle is thus set up at the end of which the machine is turned off as described in detail heretofore.

Considering now the facilities provided for permitting repeated play of a single record positioned on the turntable 56, the shaft 698 which supports to the hold down arm 84 extends below the base plate 50 and a flat plate 700 is fixedly mounted on the bottom end of the shaft 698, a coil spring 702 being positioned between the plate 700 and the base plate 50. During normal operation of the changer, when the hold down arm 84 is positioned in either the loading position shown in full lines in FIG. 1 or the hold down position shown in dotted lines at 87 in FIG. 1, the plate 700 is positioned out of the path of an extension finger portion 704 of the shutoff disabling lever 688. Accordingly, the plate 700 does not normally interfere with pivotal movement of the lever 688 as the sensor actuating slide 532 is moved downwardly to actuate the sensor 516 and establish a shutoff cycle if no records are present on the platform 76. However, when the hold down arm 84 is moved to the repeat play position, shown in dotted lines at 686 in FIG. 1, a pin provided on the shaft 698 is moved into alignment with a keyway provided in the post 86 and the hold down arm 85 drops down under the force of the spring 702. The plate 700 is thus moved to the position shown in FIGS. 47 and 48 wherein the outer edge of the plate 700 is immediately over the finger portion 704 of the lever 688. Under these conditions the lever 688 is now blocked from pivotal movement and the inclined edge 690 thereof prevents the sensor actuating slide 532 from moving downwardly by an amount sufficient to position the arm 564 thereof in blocking relation to the index pawl member 476. Accordingly, no automatic shutoff cycle is set up and the pawl 478 is positioned to the 7-inch or 12-inch position, depending upon the position of the platform 76. Thus, the record positioned on the turntable 56 will continue to be played repeatedly and the tone arm positioned properly to engage this record. In the event that it is then desired to turn the changer off, either the tone arm 68 may be manually lifted off of the record and moved outwardly beyond the rest post, which unlatches the shutoff bar 412 as described in detail heretofore in connection with FIG. 24, and turns the changer off immediately. In the alternative, the control slide 70 may be moved to a point slightly beyond the OFF position. Movement of the control slide 70 to this position slides 636 so that the flange 650 thereof is positioned adjacent the bushing 482 and restrains the index pawl 478 in the rest position so that the tone arm moves outwardly beyond the rest position during that record changing cycle and the machine is automatically shut off, as described in detail heretofore.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In an automatic record changer, a rotatable turntable, means for rotating said turntable, a record supporting spindle positioned at the center of said turntable for supporting records having a relatively small centering aperture, said spindle having means defining a record supporting shelf on which a stack of small centering aperture records may be placed, a record supporting platform positioned to support the edge of the bottom record of a stack of records seated on said shelf, means for ejecting the bottom record of a stack of records seated on said shelf and supported on said platform, a record hold down member arranged to engage the top record of a stack of records supported on said platform, and at last record sensing member operable independently of said hold down member and movable in a generally vertical plane, means operable during the record changing cycle for moving said sensing member into engagement with the outer edge of a record held on said platform by said hold down member, and means responsive to inward of said sensing member when no record is positioned on said platform for de-energizing said turntable rotating means.

2. The combination of claim 1, wherein said platform and said sensing member are both pivotally mounted for rotation about a horizontal axis.

3. The combination of claim 2, which includes a carriage slidably mounted for movement toward said spindle during a record changing cycle, and means mounting said platform on said carriage so that the top thereof is moved toward said spindle in response to said movement of said carriage.

4. The combination of claim 1, wherein said platform is provided with a pair of spaces apart ledges for supporting the edge of the bottom record, and said sensing member is movable between said ledges to sense the absence of a record thereon.

5. In an automatic record changer, a rotatable turntable, means for rotating said turntable, a record supporting spindle positioned at the center of said turntable for supporting records having a relatively small centering aperture, said spindle having means defining a record supporting shelf on which a stack of small centering aperture records may be placed, a record supporting platform positioned to support the edge of the bottom record of a stack of records seated on said shelf, a hold down member positioned adjacent said platform and movable into engagement with the top record of said stack at a point adjacent said platform and remote from said spindle, means for moving the bottom record of said stack off of said shelf and onto said turntable, a last record sensing member operable independently of said hold down member and movable in a generally vertical plane, means operable during the record changing cycle for moving said sensing member into engagement with the outer edge of a record held on said platform by said hold down member, automatic shutoff means responsive to inward movement of said sensing member when no record is positioned on said platform for de-energizing said turn-table rotatable means, and responsive to movement of said hold down member to a repeat play position for disabling said automatic shutoff means.

6. The combination of claim 5, wherein said repeat play position of said hold-down member is at a point removed from the edge of said record stack.

7. The combination of claim 5, wherein said hold-down member is movable to a loading position at which said member is positioned outside the edge of said record stack, and said repeat play position of said member is removed from the edge of said record stack and beyond said loading position.

8. The combination of claim 5, wherein said holdown member is elevated for movement to said repeat play position and is movable downwardly in said repeat play position to disable said automatic shutoff means.

9. In an automatic record changer, a rotatable turntable, a turntable stub positioned at the center of said turntable for centering a record manually deposited on said turntable, said stub having a vertically extending slot therein, means for preventing said turntable stub from rotating, a flat blade spindle positionable in said slot and provided with a record supporting shelf, a platform positioned to support the edge of the bottom record of a stack of records seated on said shelf and aligned with said vertically extending slot in said turntable stub, and means operative during a record changing cycle for moving the bottom record of said stack off of said shelf and onto said turntable stub.

10. The combination of claim 9, wherein said turntable stub is manually movable between two vertically spaced positions, and means responsive to the manual positioning of said stub to either of said two positions for controlling the speed of said turntable.

11. The combination of claim 10, wherein said stub is vertically adjustable to control the speed of said turntable while said flat blade spindle is positioned in said slot.

12. The combination of claim 10 wherein said stub is slidably mounted within a fixed sleeve positioned at the center of said turntable, and detent means for releasably detenting said stub at said two vertically spaced positions.

13. The combination of claim 12, wherein said stub carries indicia corresponding to different speeds of said turntable, said indicia being positioned along the length of said stub so that a portion thereof is covered by the end of said sleeve when said stub is moved to one of said positions.

14. The combination of claim 12, wherein said flat blade spindle is provided with a flange adapted to engage said sleeve when said spindle is positioned in said slot, thereby to position said shelf at a predetermined height above said turntable.

* * * * *